US012454909B2

(12) United States Patent
Benjamin et al.

(10) Patent No.: US 12,454,909 B2
(45) Date of Patent: *Oct. 28, 2025

(54) COMBUSTOR SIZE RATING FOR A GAS TURBINE ENGINE USING HYDROGEN FUEL

(71) Applicant: General Electric Company, Schenectady, NY (US)

(72) Inventors: Michael A. Benjamin, Cincinnati, OH (US); Manampathy G. Giridharan, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,559

(22) Filed: May 24, 2024

(65) Prior Publication Data

US 2024/0309804 A1 Sep. 19, 2024

Related U.S. Application Data

(63) Continuation-in-part of application No. 17/457,559, filed on Dec. 3, 2021, now Pat. No. 12,078,100.

(51) Int. Cl.
*F02C 7/22* (2006.01)
*F02C 3/22* (2006.01)
*F23R 3/28* (2006.01)

(52) U.S. Cl.
CPC ............... *F02C 3/22* (2013.01); *F02C 7/22* (2013.01); *F23R 3/28* (2013.01); *F05D 2220/323* (2013.01); *F05D 2240/35* (2013.01)

(58) Field of Classification Search
CPC .......... F02C 3/20; F02C 3/22; F05D 2250/80; F23R 3/286
See application file for complete search history.

(56) References Cited

U.S. PATENT DOCUMENTS 2,565,843 A    8/1951   Dennison
2,616,258 A   11/1952   Mock
(Continued)

FOREIGN PATENT DOCUMENTS

CN      1222660 A    7/1999
CN   101184912 A    5/2008
(Continued)

OTHER PUBLICATIONS

Lefebvre et al., "Gas Turbine Combustion: Alternative Fuels and Emissions," CRC Press, 3rd Edition (Apr. 26, 2010).
(Continued)

*Primary Examiner* — Gerald L Sung
(74) *Attorney, Agent, or Firm* — McGarry Bair PC

(57) ABSTRACT

A gas turbine engine includes a hydrogen fuel delivery assembly configured to deliver a hydrogen fuel flow, a compressor section configured to compress air flowing therethrough to provide a compressed air flow, and a combustor including a combustion chamber having a burner length and a burner dome height. The combustion chamber is configured to combust a mixture of the hydrogen fuel flow and the compressed air flow. The combustion chamber can be characterized by a combustor size rating between one inch and seven inches. In more detail, the combustion chamber can be characterized by the combustor size rating between one inch and seven inches at a core air flow parameter between two and one half kN and sixty kN, in which the combustor size rating is a function of the core air flow parameter.

20 Claims, 20 Drawing Sheets

(56) References Cited

U.S. PATENT DOCUMENTS

| | | |
|---|---|---|
| 3,917,173 A | 11/1975 | Singh |
| 3,946,552 A | 3/1976 | Weinstein et al. |
| 3,972,182 A | 8/1976 | Salvi |
| 4,100,733 A | 7/1978 | Striebel et al. |
| 4,177,637 A | 12/1979 | Pask |
| 4,215,535 A | 8/1980 | Lewis |
| 4,222,232 A | 9/1980 | Robinson |
| 4,226,083 A | 10/1980 | Lewis et al. |
| 4,262,482 A | 4/1981 | Roffe et al. |
| 4,375,150 A | 3/1983 | Nikiforakis |
| 4,408,461 A | 10/1983 | Bruhwiler et al. |
| 4,412,414 A | 11/1983 | Novick et al. |
| 4,689,961 A | 9/1987 | Stratton |
| 4,763,481 A | 8/1988 | Cannon |
| 4,794,754 A | 1/1989 | Shekleton et al. |
| 4,967,561 A | 11/1990 | Bruhwiler et al. |
| 5,109,670 A | 5/1992 | Harshman |
| 5,121,597 A | 6/1992 | Urushidani et al. |
| 5,207,064 A | 5/1993 | Ciokajlo et al. |
| 5,211,675 A | 5/1993 | Bardey et al. |
| 5,235,817 A | 8/1993 | Leonard |
| 5,251,447 A | 10/1993 | Joshi et al. |
| 5,263,325 A | 11/1993 | McVey et al. |
| 5,265,409 A | 11/1993 | Smith, Jr. et al. |
| 5,307,633 A | 5/1994 | Koemer et al. |
| 5,307,634 A | 5/1994 | Hu |
| 5,335,502 A | 8/1994 | Roberts, Jr. et al. |
| 5,339,635 A | 8/1994 | Iwai et al. |
| 5,351,477 A | 10/1994 | Joshi et al. |
| 5,373,693 A | 12/1994 | Zarzalis et al. |
| 5,408,830 A | 4/1995 | Lovett |
| 5,511,375 A | 4/1996 | Joshi et al. |
| 5,592,821 A | 1/1997 | Alary et al. |
| 5,619,855 A | 4/1997 | Burrus |
| 5,622,054 A | 4/1997 | Tingle |
| 5,675,971 A | 10/1997 | Angel |
| 5,791,137 A | 8/1998 | Evans et al. |
| 5,816,049 A | 10/1998 | Joshi |
| 5,829,967 A | 11/1998 | Chyou |
| 5,839,283 A | 11/1998 | Dobbeling |
| 5,862,668 A | 1/1999 | Richardson |
| 5,881,756 A | 3/1999 | Abbasi et al. |
| 5,937,653 A | 8/1999 | Alary et al. |
| 5,987,889 A | 11/1999 | Graves |
| 6,016,658 A | 1/2000 | Willis et al. |
| 6,038,861 A | 3/2000 | Amos et al. |
| 6,158,223 A | 12/2000 | Mandai et al. |
| 6,272,840 B1 | 8/2001 | Crocker et al. |
| 6,286,298 B1 | 9/2001 | Burrus et al. |
| 6,295,801 B1 | 10/2001 | Burrus et al. |
| 6,331,109 B1 | 12/2001 | Paikert et al. |
| 6,367,262 B1 | 4/2002 | Mongia et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,727 B1 | 4/2003 | Cornwell et al. |
| 6,543,235 B1 | 4/2003 | Crocker et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,609,376 B2 | 8/2003 | Rokke |
| 6,742,338 B2 | 6/2004 | Tanaka et al. |
| 6,772,594 B2 | 8/2004 | Nishida et al. |
| 6,810,673 B2 | 11/2004 | Snyder |
| 6,837,050 B2 | 1/2005 | Mandai et al. |
| 6,837,051 B2 | 1/2005 | Mandai et al. |
| 6,915,637 B2 | 7/2005 | Nishida et al. |
| 6,920,758 B2 | 7/2005 | Matsuyama et al. |
| 6,962,055 B2 | 11/2005 | Chen et al. |
| 7,014,835 B2 | 3/2006 | Mathias et al. |
| 7,017,329 B2 | 3/2006 | Farhangi et al. |
| 7,036,482 B2 | 5/2006 | Beck et al. |
| 7,117,677 B2 | 10/2006 | Inoue et al. |
| 7,188,476 B2 | 3/2007 | Inoue et al. |
| 7,200,998 B2 | 4/2007 | Inoue et al. |
| 7,284,378 B2 | 10/2007 | Amond, III et al. |
| 7,313,919 B2 | 1/2008 | Inoue et al. |
| 7,343,745 B2 | 3/2008 | Inoue et al. |
| 7,360,363 B2 | 4/2008 | Mandai et al. |
| 7,434,401 B2 | 10/2008 | Hayashi |
| 7,469,544 B2 | 12/2008 | Farhangi |
| 7,516,607 B2 | 4/2009 | Farhangi et al. |
| 7,565,803 B2 | 7/2009 | Li et al. |
| 7,610,759 B2 | 11/2009 | Yoshida et al. |
| 7,677,026 B2 | 3/2010 | Conete et al. |
| 7,762,074 B2 | 7/2010 | Bland et al. |
| 7,770,397 B2 | 8/2010 | Patel et al. |
| 7,788,929 B2 | 9/2010 | Biebel et al. |
| 7,810,333 B2 | 10/2010 | Kraimer et al. |
| 7,814,480 B2 | 10/2010 | Sakuda et al. |
| 7,871,262 B2 | 1/2011 | Carroni et al. |
| 7,900,457 B2 | 3/2011 | Patterson et al. |
| 7,966,801 B2 | 6/2011 | Umeh et al. |
| 8,033,112 B2 | 10/2011 | Milosavljevic et al. |
| 8,033,821 B2 | 10/2011 | Ergolu |
| 8,057,224 B2 | 11/2011 | Knoepfel |
| 8,128,007 B2 | 3/2012 | Thomas |
| 8,161,751 B2 | 4/2012 | Hall |
| 8,225,591 B2 | 7/2012 | Johnson et al. |
| 8,225,613 B2 | 7/2012 | Sisco et al. |
| 8,234,871 B2 | 8/2012 | Davis, Jr. et al. |
| 8,266,911 B2 | 9/2012 | Evulet |
| 8,276,385 B2 | 10/2012 | Zuo et al. |
| 8,316,644 B2 | 11/2012 | Wilbraham |
| 8,322,143 B2 | 12/2012 | Uhm et al. |
| 8,424,311 B2 | 4/2013 | York et al. |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,590,311 B2 | 11/2013 | Parsania et al. |
| 8,621,870 B2 | 1/2014 | Carroni et al. |
| 8,671,691 B2 | 3/2014 | Boardman et al. |
| 8,701,417 B2 | 4/2014 | Nicholls et al. |
| 8,726,626 B2 | 5/2014 | Spooner |
| 8,863,524 B2 | 10/2014 | Karlsson et al. |
| 8,938,971 B2 | 1/2015 | Payyapakkam et al. |
| 8,943,835 B2 | 2/2015 | Corsmeier et al. |
| 9,091,444 B2 | 7/2015 | Turrini et al. |
| 9,335,050 B2 | 5/2016 | Cunha et al. |
| 9,377,192 B2 | 6/2016 | Hirata et al. |
| 9,388,985 B2 | 7/2016 | Wu et al. |
| 9,416,973 B2 | 8/2016 | Melton et al. |
| 9,423,137 B2 | 8/2016 | Nickolaus |
| 9,581,085 B2 | 2/2017 | Bartz et al. |
| 10,101,025 B2 | 10/2018 | Berhaut et al. |
| 10,190,744 B2 | 1/2019 | Mook et al. |
| 10,317,080 B2 | 6/2019 | Tu, Jr. et al. |
| 10,775,047 B2 | 9/2020 | Horikawa et al. |
| 10,865,989 B2 | 12/2020 | Sadasivuni |
| 11,674,443 B2 | 6/2023 | McCurdy Gibson et al. |
| 11,732,652 B2 | 8/2023 | Sibbach et al. |
| 12,078,100 B2 * | 9/2024 | Benjamin .............. B64D 27/10 |
| 2003/0101729 A1 | 6/2003 | Srinivasan |
| 2005/0287407 A1 | 12/2005 | Bushko |
| 2006/0035188 A1 | 2/2006 | Berenbrink et al. |
| 2008/0078182 A1 | 4/2008 | Evulet |
| 2008/0256924 A1 | 10/2008 | Pederson et al. |
| 2009/0199563 A1 | 8/2009 | Chen |
| 2010/0101229 A1 | 4/2010 | York |
| 2010/0293959 A1 | 11/2010 | Remy et al. |
| 2011/0016871 A1 | 1/2011 | Kraemer et al. |
| 2011/0083439 A1 | 4/2011 | Zuo et al. |
| 2011/0088401 A1 | 4/2011 | Mancini et al. |
| 2011/0252803 A1 | 10/2011 | Subramaniam et al. |
| 2012/0096866 A1 | 4/2012 | Khan et al. |
| 2012/0131923 A1 | 5/2012 | Elkady et al. |
| 2012/0144832 A1 | 6/2012 | Herbon et al. |
| 2012/0186256 A1 | 7/2012 | Dai |
| 2012/0285173 A1 | 11/2012 | Poyyapakkam et al. |
| 2012/0305673 A1 | 12/2012 | Matsuyama et al. |
| 2012/0308947 A1 | 12/2012 | Melton et al. |
| 2013/0042625 A1 | 2/2013 | Barker et al. |
| 2013/0199188 A1 | 8/2013 | Boardman et al. |
| 2013/0239581 A1 | 9/2013 | Johnson et al. |

(56) References Cited

U.S. PATENT DOCUMENTS

| | | |
|---|---|---|
| 2013/0327011 A1 | 12/2013 | Overby et al. |
| 2013/0336759 A1 | 12/2013 | Christians |
| 2014/0060060 A1 | 3/2014 | Bernero et al. |
| 2014/0090392 A1 | 4/2014 | Meisner et al. |
| 2014/0165578 A1 | 6/2014 | Burd |
| 2014/0182294 A1 | 7/2014 | Matsumoto et al. |
| 2014/0290258 A1 | 10/2014 | Gerendas et al. |
| 2015/0076251 A1 | 3/2015 | Berry |
| 2015/0082797 A1 | 3/2015 | Matsuyama |
| 2015/0128607 A1 | 5/2015 | Lee |
| 2015/0159874 A1 | 6/2015 | Toon et al. |
| 2015/0159875 A1 | 6/2015 | Berry et al. |
| 2015/0323189 A1 | 11/2015 | Jeney et al. |
| 2016/0010856 A1 | 1/2016 | Biagioli et al. |
| 2016/0033132 A1 | 2/2016 | Venkatesan et al. |
| 2016/0169110 A1 | 6/2016 | Myers et al. |
| 2016/0209036 A1 | 7/2016 | Cheung |
| 2017/0089582 A1 | 3/2017 | Carrotte et al. |
| 2017/0298817 A1 | 10/2017 | Horiuchi et al. |
| 2018/0128490 A1* | 5/2018 | Boardman ............... F23R 3/283 |
| 2019/0017441 A1 | 1/2019 | Venkatesan et al. |
| 2019/0024899 A1 | 1/2019 | Patel et al. |
| 2019/0093895 A1 | 3/2019 | Lind |
| 2020/0095956 A1 | 3/2020 | Ortelt et al. |
| 2021/0071590 A1 | 3/2021 | Beita et al. |
| 2021/0071870 A1 | 3/2021 | Bulat |
| 2022/0030631 A1 | 1/2022 | Jung et al. |
| 2022/0196242 A1 | 6/2022 | Shin |
| 2022/0268213 A1 | 8/2022 | Morenko |
| 2022/0307428 A1 | 9/2022 | Sibbach et al. |

FOREIGN PATENT DOCUMENTS

| | | |
|---|---|---|
| CN | 101725984 A | 6/2010 |
| CN | 101943060 A | 1/2011 |
| CN | 102235244 A | 11/2011 |
| CN | 202852884 U | 4/2013 |
| CN | 103119370 A | 5/2013 |
| CN | 103438480 A | 12/2013 |
| CN | 104870895 A | 8/2015 |
| CN | 204987087 U | 1/2016 |
| CN | 205090421 U | 3/2016 |
| CN | 205481129 U | 8/2016 |
| CN | 111553044 A | 8/2020 |
| CN | 112231903 A | 1/2021 |
| CN | 212537825 U | 2/2021 |
| DE | 202011054667 A1 | 4/2012 |
| EP | 1319896 A1 | 6/2003 |
| EP | 1336800 A1 | 8/2003 |
| EP | 1736707 A1 | 1/2018 |
| EP | 4271939 A1 | 11/2023 |
| GB | 2462905 A1 | 3/2010 |
| GB | 25850525 A | 12/2020 |
| JP | H10-196957 A | 7/1998 |
| JP | 2014088874 A | 5/2014 |
| WO | 2011031280 A1 | 3/2011 |
| WO | 2011086336 A1 | 7/2011 |

OTHER PUBLICATIONS

Morgan et al., "Longitudinal Instability Limits With a Variable-Length Hydrogen-Oxygen Combustor," NASA Technical Note, Lewis Research Center, National Aeronautics and Space Administration (1971).

Hua et al., "Numerical simulation of combustion of hydrogen air mixture in micro-scaled chamber. Part I: Fundamental Study" Mar. 31, 2005 (Year: 2005).

T.S. Snyder et al.. "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, pp. 38-45, Jan. 1, 1996.

Srinivasan et al. "Improving low load combustion, stability, and emissions in pilot-ignited natural gas engines", Journal of Automobile Engineering, Sage journals, vol. 220, No. 2, pp. 229-239, Feb. 1, 2006.

* cited by examiner

COMBUSTOR SIZE RATING FOR A GAS TURBINE ENGINE USING HYDROGEN FUEL

CROSS-REFERENCE TO RELATED APPLICATION(S)

This application is a continuation-in-part of U.S. application Ser. No. 17/457,559, filed Dec. 3, 2021, now U.S. Pat. No. 12,078,100 issued Sep. 3, 2024, which is incorporated herein by reference in its entirety.

TECHNICAL FIELD

The present disclosure relates to a combustor for a gas turbine engine using hydrogen fuel, and in particular, for a gas turbine engine for aircraft.

BACKGROUND

The propulsion system for commercial aircraft typically includes one or more aircraft engines, such as turbofan jet engines. The aircraft engine(s) may be mounted to a respective one of the wings of the aircraft, such as in a suspended position beneath the wing using a pylon. These engines may be powered by aviation turbine fuel, which is typically a combustible hydrocarbon liquid fuel, such as a kerosene-type fuel, having a desired carbon number and carbon to hydrogen ratio. Such fuel produces carbon dioxide emissions upon combustion and improvements to reduce such carbon dioxide emissions in commercial aircraft are desired.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
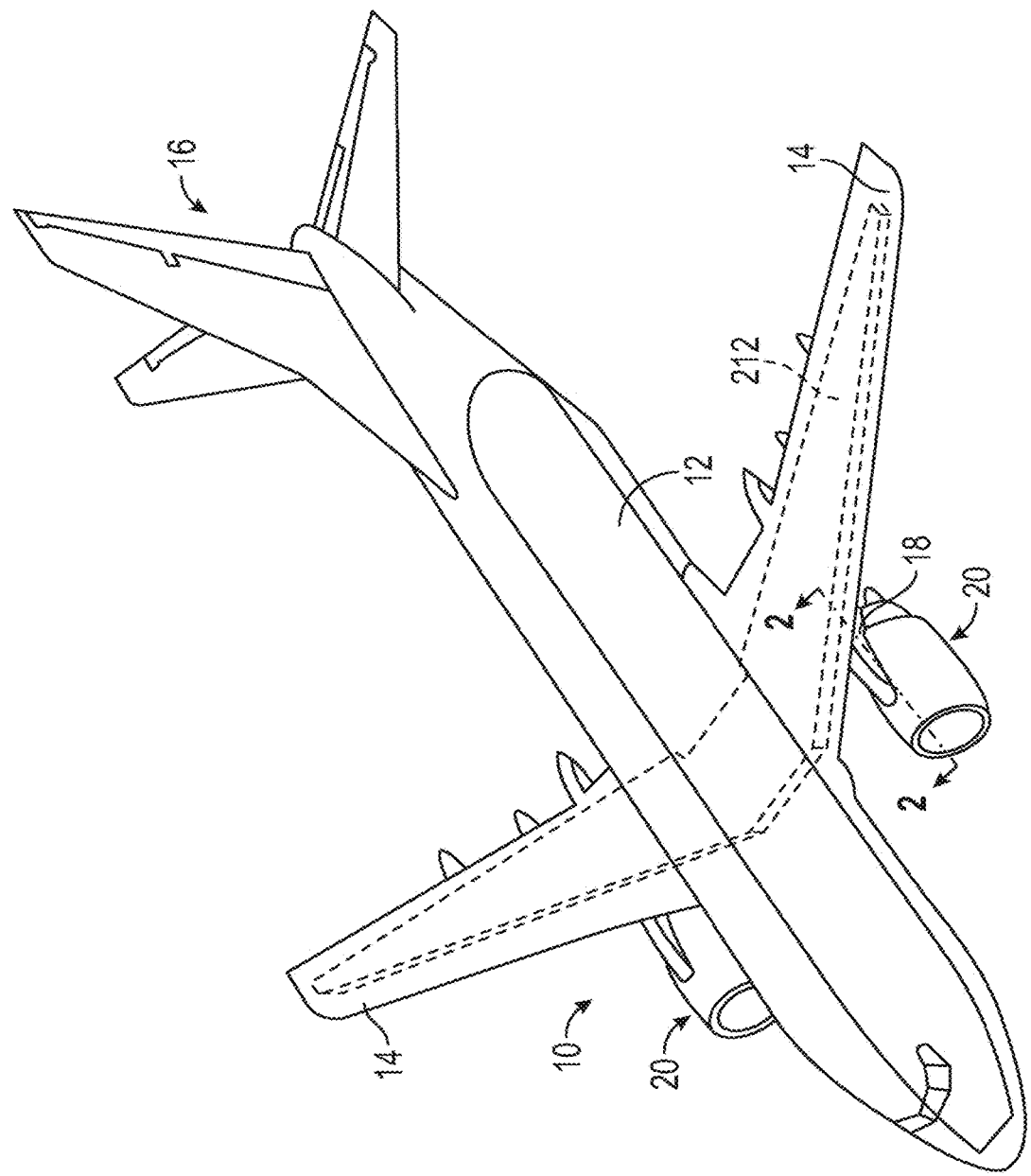
FIG. 1 is a schematic perspective view of an aircraft having a gas turbine engine according to an embodiment of the present disclosure.

Features, advantages, and embodiments of the present disclosure are set forth or apparent from consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

The term "bypass ratio," unless stated otherwise, means the bypass ratio at take off conditions. The term bypass ratio as used herein means the ratio between the mass flow rate of air flow accelerated by the engine that bypasses the engine core to the mass flow rate of the air flow entering the engine core. For example, in an exemplary engine such as the turbofan engine 100 depicted in FIG. 2 and discussed further below, the bypass ratio is the ratio of the mass flow rate of the air flow entering the bypass air flow passage 140 to the mass flow rate of the air flow entering the core air flow path 121. The bypass ratio can also be estimated as a ratio of the area of an inlet to the bypass duct (e.g., inlet of the bypass air flow passage 140, discussed below) or an area swept by a rotor (e.g., the area swept by fan blades 322, discussed below) to the area of the inlet to the engine core (e.g., inlet of the core air flow path 121).

The term "thrust," unless stated otherwise, means the maximum thrust at take off. This meaning of thrust is adopted when computing a core airflow parameter (relationship 2), below).

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustible hydrocarbon liquid fuel, such as Jet-A fuel, has long been used in gas turbine engines and the components of gas turbine engines, particularly, the combustor, have been designed for such fuels. A hydrogen fuel may be utilized to eliminate carbon dioxide emissions from commercial aircraft. Hydrogen fuel, however, poses a number of challenges as compared to combustible hydrocarbon liquid fuel, such as Jet-A fuel. Hydrogen fuel, for example, is a highly reactive fuel that burns at higher temperatures than combustible hydrocarbon liquid fuel. Hydrogen fuel also has much higher flame speeds. For example, the laminar flame speed for a hydrogen fuel of diatomic hydrogen is an order of magnitude greater than the laminar flame speed for Jet-A fuel.

When testing hydrogen fuel in current gas turbine engines with rich burn combustors, we, the inventors, observed that the higher combustion temperature of hydrogen fuel results in increased production of nitrogen oxides ("NOx"), as compared to combustible hydrocarbon liquid fuel. We also observed in our testing that NOx emissions are sensitive to combustor residence time. As noted above, hydrogen fuel is highly reactive (relative to other fuels) with a wide range of flammability limits and very high flame speeds, resulting in a very short hydrogen flame close to the front end of the combustor. With such a short flame, the post-flame residence time increases for combustors designed for Jet-A fuel. These findings resulted in a realization that when designing a hydrogen fuel combustor to meet NOx emission targets, the combustor residence time needs to be reduced by more than about fifty percent. To find a suitable combustor design for gas turbine engines using hydrogen fuel, we conceived of a wide variety of combustors having different shapes and sizes in order to determine which embodiment(s) were most promising for a variety of contemplated engine designs and thrust classes. The various embodiments, as described herein and as shown in the figures, are combustors that are sized to meet NOx emissions targets.

FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 20. In this embodiment, each engine 20 is attached to one of the wings 14 by a pylon 18 in an under-wing configuration. Although the engines 20 are shown attached to the wing 14 in an under-wing configuration in FIG. 1, in other embodiments, the engine 20 may have alternative configurations and be coupled to other portions of the aircraft 10. For example, the engine 20 may additionally or alternatively include one or more aspects coupled to other parts of the aircraft 10, such as, for example, the empennage 16 and the fuselage 12.

As will be described further below with reference to FIG. 2, the engines 20 shown in FIG. 1 are gas turbine engines that are each capable of selectively generating a propulsive thrust for the aircraft 10. The amount of propulsive thrust may be controlled at least in part based on a volume of fuel provided to the gas turbine engines 20 via a fuel system 200. The fuel is stored in a fuel tank 212 of the fuel system 200. As shown in FIG. 1, at least a portion of the fuel tank 212 is located in each wing 14 and a portion of the fuel tank 212 is located in the fuselage 12 between the wings 14. The fuel tank 212, however, may be located at other suitable locations in the fuselage 12 or the wing 14. The fuel tank 212 may also be located entirely within the fuselage 12 or the wing 14. The fuel tank 212 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). The engine 20 may be used in various other applications including stationary power generation systems and other vehicles beyond the aircraft 10 explicitly described herein, such as boats, ships, cars, trucks, and the like.

Figure 2:
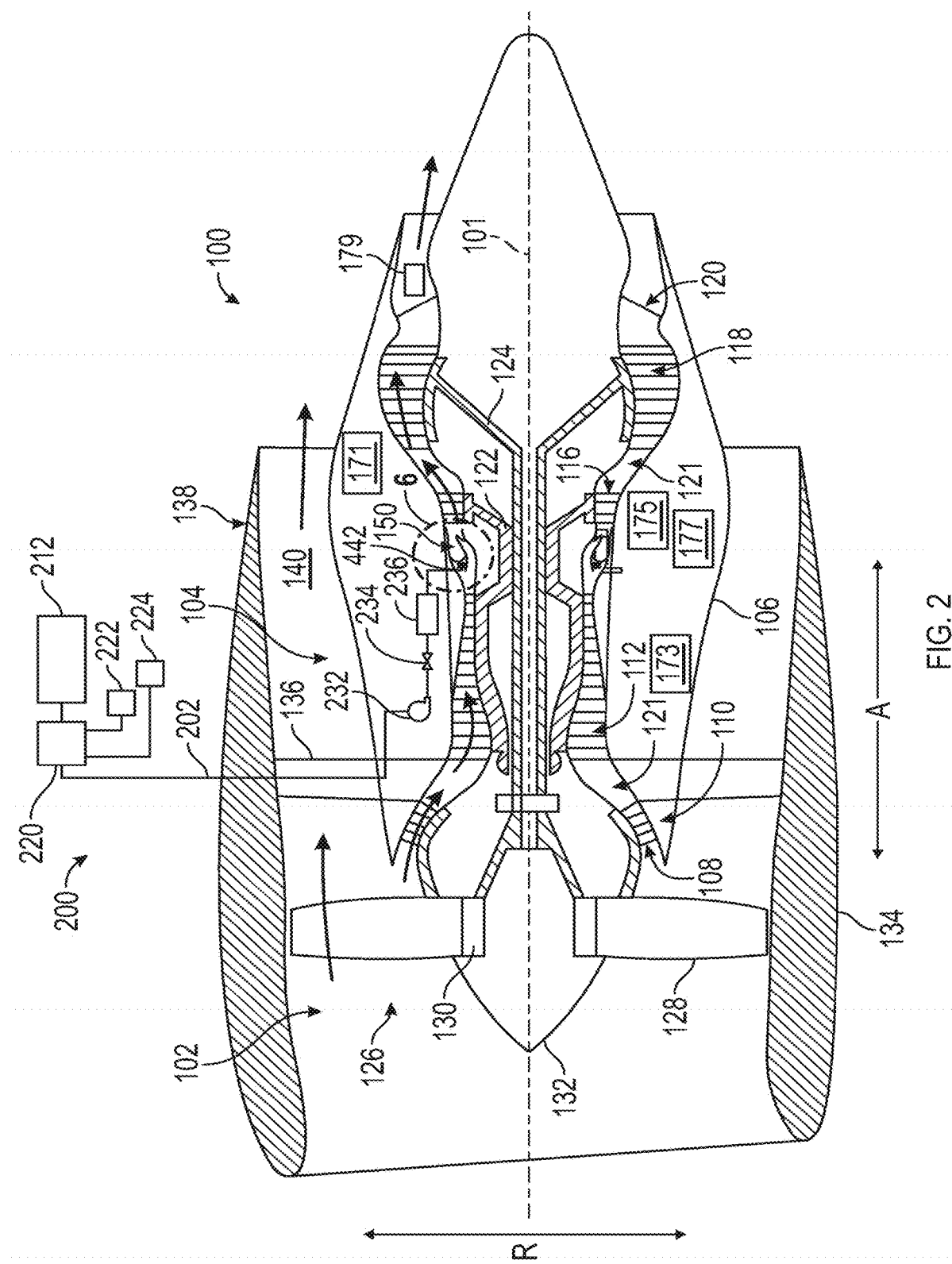
FIG. 2 is a schematic, cross-sectional view, taken along line 2-2 in FIG. 1 of the gas turbine engine of the aircraft shown in FIG. 1.

FIG. 2 is a schematic, cross-sectional view of one of the engines 20 used in the propulsion system for the aircraft 10 shown in FIG. 1. The cross-sectional view of FIG. 2 is taken along line 2-2 in FIG. 1. For the embodiment depicted in FIG. 2, the engine 20 is a high bypass turbofan engine that is referred to as a turbofan engine 100 herein. The turbofan engine 100 has an axial direction A (extending parallel to a longitudinal centerline axis 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer housing or nacelle 106 and an inlet 108. Within the housing 106 there is an engine core, which includes, in a serial flow relationship, a compressor section including a booster or low-pressure (LP) compressor 110 and a high-pressure (HP) compressor 112, a combustion section 150 (also referred to herein as a combustor 150), a turbine section including a high-pressure (HP) turbine 116 and a low-pressure (LP) turbine 118, and a jet exhaust nozzle section 120. The compressor section, the combustor 150, and the turbine section together define at least in part a core air flow path 121 extending from the inlet 108 to the jet exhaust nozzle section 120. The turbofan engine 100 further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline axis 101 by the LP shaft 124. The booster 108 may also be directly driven by the LP shaft 124, as depicted in FIG. 2. The disk 130 is covered by a rotatable front hub 132 aerodynamically contoured to promote an air flow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass air flow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 212 to the turbofan engine 100, and, more specifically, to a plurality of fuel nozzles 442 that inject fuel into a combustion chamber 430 of the combustor 150.

The turbofan engine 100 also includes various accessory systems to aid in the operation of the turbofan engine 100 and/or an aircraft including the turbofan engine 100. For example, the turbofan engine 100 may include a main lubrication system 171, a compressor cooling air (CCA) system 173, an active thermal clearance control (ATCC) system 175, and a generator lubrication system 177, each of which is depicted schematically in FIG. 2. The main lubrication system 171 is configured to provide a lubricant to, for example, various bearings and gear meshes in the compressor section, the turbine section, the HP spool 122, and the LP shaft 124. The lubricant provided by the main lubrication system 171 may increase the useful life of such components and may remove a certain amount of heat from such components through the use of one or more heat exchangers. The compressor cooling air (CCA) system 173 provides air from one or both of the HP compressor 112 or LP compressor 110 to one or both of the HP turbine 116 or LP turbine 118. The active thermal clearance control (ATCC) system 175 acts to minimize a clearance between tips of turbine blades and casing walls as casing temperatures vary during a flight mission. The generator lubrication system 177 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100.

Heat from these accessory systems 171, 173, 175, and 177, and other accessory systems, may be provided to various heat sinks as waste heat from the turbofan engine 100 during operation, such as to various vaporizers 220, as discussed below. Additionally, the turbofan engine 100 may include one or more heat exchangers 179 within, for example, the turbine section or jet exhaust nozzle section 120 for extracting waste heat from an air flow therethrough to also provide heat to various heat sinks, such as the vaporizers 220, discussed below.

The fuel system 200 of this embodiment is configured to store the fuel for the turbofan engine 100 in the fuel tank 212 and to deliver the fuel to the turbofan engine 100 via the fuel delivery assembly 202. The fuel delivery assembly 202 includes tubes, pipes, and the like, to fluidly connect the various components of the fuel system 200 to the turbofan engine 100. As discussed above, the turbofan engine 100, and, in particular, the combustor 150 discussed herein may be particularly suited for use with hydrogen fuel (diatomic hydrogen). In the embodiments shown in FIG. 2, the fuel is a hydrogen fuel comprising hydrogen, more specifically, diatomic hydrogen. In some embodiments, the hydrogen fuel may consist essentially of hydrogen.

The fuel tank 212 may be configured to hold the hydrogen fuel at least partially in the liquid phase and may be configured to provide hydrogen fuel to the fuel delivery assembly 202 substantially completely in the liquid phase, such as completely in the liquid phase. For example, the fuel tank 212 may have a fixed volume and contain a volume of the hydrogen fuel in the liquid phase (liquid hydrogen fuel). As the fuel tank 212 provides hydrogen fuel to the fuel delivery assembly 202 substantially completely in the liquid phase, the volume of the liquid hydrogen fuel in the fuel tank 212 decreases and the remaining volume in the fuel tank 212 is made up by, for example, hydrogen in the gaseous phase (gaseous hydrogen). As used herein, the term "substantially completely" as used to describe a phase of the hydrogen fuel, refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 212 at very low (cryogenic) temperatures. For example, the hydrogen fuel may be stored in the fuel tank 212 at about −253 degrees Celsius or less at atmospheric pressure, or at other temperatures and pressures to maintain the hydrogen fuel substantially in the liquid phase. The fuel tank 212 may be made from known materials such as titanium, Inconel®, aluminum, or composite materials. The fuel tank 212 and the fuel system 200 may include a variety of supporting structures and components to facilitate storing the hydrogen fuel in such a manner.

The liquid hydrogen fuel is supplied from the fuel tank 212 to the fuel delivery assembly 202. The fuel delivery assembly 202 may include one or more lines, conduits, etc., configured to carry the hydrogen fuel between the fuel tank 212 and the turbofan engine 100. The fuel delivery assembly 202 thus provides a flow path of the hydrogen fuel from the fuel tank 212 to the turbofan engine 100. The hydrogen fuel is delivered to the engine by the fuel delivery assembly 202 in the gaseous phase, the supercritical phase, or both (e.g., the gaseous phase and the supercritical phase). The fuel system 200 thus includes a vaporizer 220 in fluid communication with the fuel delivery assembly 202 to heat the liquid hydrogen fuel flowing through the fuel delivery assembly 202. The vaporizer 220 is positioned in the flow path of the hydrogen fuel between the fuel tank 212 and the turbofan engine 100. The vaporizer 220 may be positioned at least partially within the fuselage 12 or the wing 14 (both shown in FIG. 1), such as at least partially within the wing 14. The vaporizer 220 may, however, be positioned at other suitable locations in the flow path of the hydrogen between the fuel tank 212 and the turbofan engine 100. For example, the vaporizer 220 may be positioned external to the fuselage 12 and the wing 14 (both shown in FIG. 1) and positioned at least partially within the pylon 18 (FIG. 1) or the turbofan engine 100 (FIG. 2). When positioned in the turbofan engine 100, the vaporizer may be located in the nacelle 134, for example. Although only one vaporizer 220 is shown in FIG. 2, the fuel system 200 may include multiple vaporizers 220. For example, when a vaporizer 220 is positioned in the turbofan engine 100 or in the pylon 18 and functions as a primary vaporizer configured to operate once the turbofan engine 100 is in a thermally stable condition, another vaporizer 220 is positioned upstream of the primary vaporizer and proximate to the fuel tank 212, and functions as a primer vaporizer during start-up (or prior to start-up) of the turbofan engine 100.

The vaporizer 220 is in thermal communication with at least one heat source 222, 224. In this embodiment, the vaporizer 220 is in thermal communication with a primary heat source 222 and an auxiliary heat source 224. In this embodiment, primary heat source 222 is waste heat from the turbofan engine 100, and the vaporizer 220 is, thus, thermally connected to at least one of the main lubrication system 171, the compressor cooling air (CCA) system 173, the active thermal clearance control (ATCC) system 175, the generator lubrication system 177, and the heat exchangers 179 to extract waste heat from the turbofan engine 100 to heat the hydrogen fuel. In such a manner, the vaporizer 220 is configured to operate by drawing heat from the primary heat source 222 once the turbofan engine 100 is capable of providing enough heat, via the auxiliary heat source 224, to the vaporizer 220, in order to facilitate operation of the vaporizer 220.

The vaporizer 220 may be heated by any suitable heat source, and, in this embodiment, for example, the auxiliary heat source 224 is a heat source external to the turbofan engine 100. The auxiliary heat source 224 may include, for example, an electrical power source, a catalytic heater or burner, and/or a bleed air flow from an auxiliary power unit. The auxiliary heat source 224 may be integral to the vaporizer 220, such as when the vaporizer 220 includes one or more electrical resistance heaters, or the like, that are powered by the electrical power source. In this configuration the auxiliary heat source 224 may provide heat for the vaporizer 220 independent of whether or not the turbofan engine 100 is running and can be used, for example, during start-up (or prior to start-up) of the turbofan engine 100.

As noted, the vaporizer 220 is in communication with the flow of the hydrogen fuel through the fuel delivery assembly 202. The vaporizer 220 is configured to draw heat from at least one of the primary heat source 222 and the auxiliary heat source 224 to heat the flow of hydrogen fuel from a substantially completely liquid phase to a substantially completely gaseous phase or to a substantially completely supercritical phase.

The fuel system 200 also includes a high-pressure pump 232 in fluid communication with the fuel delivery assembly 202 to induce the flow of the hydrogen fuel through the fuel delivery assembly 202 to the turbofan engine 100. The high-pressure pump 232 may generally be the primary source of pressure rise in the fuel delivery assembly 202 between the fuel tank 212 and the turbofan engine 100. The high-pressure pump 232 may be configured to increase a pressure in the fuel delivery assembly 202 to a pressure greater than a pressure within the combustion chamber 430 of the combustor 150 of the turbofan engine 100, and to overcome any pressure drop of the components placed downstream of the high-pressure pump 232.

The high-pressure pump 232 is positioned within the flow of hydrogen fuel in the fuel delivery assembly 202 at a location downstream of the vaporizer 220. In this embodiment, the high-pressure pump 232 is positioned external to the fuselage 12 and the wing 14, and is positioned at least partially within the pylon 18, or at least partially within the turbofan engine 100. More specifically, the high-pressure pump 232 is positioned within the turbofan engine 100. With the high-pressure pump 232 located in such a position, the high-pressure pump 232 may be any suitable pump configured to receive the flow of hydrogen fuel in substantially completely a gaseous phase or a supercritical phase. In other embodiments, however, the high-pressure pump 232 may be positioned at other suitable locations, including other positions within the flow path of the hydrogen fuel. For example, the high-pressure pump 232 may be located upstream of the vaporizer 220 and may be configured to receive the flow of hydrogen fuel through the fuel delivery assembly 202 in a substantially completely liquid phase.

The fuel system 200 also includes a metering unit in fluid communication with the fuel delivery assembly 202. Any suitable metering unit may be used including, for example, a fuel metering valve 234 placed in fluid communication with the fuel delivery assembly 202. The fuel delivery assembly 202 is configured to provide the fuel metering valve 234, and the fuel metering valve 234 is configured to receive hydrogen fuel. In this embodiment, the fuel metering valve 234 is positioned downstream of the high-pressure pump 232. The fuel metering valve 234 is further configured to provide the flow of the hydrogen fuel to the turbofan engine 100 in a desired manner. The fuel metering valve 234 is configured to provide a desired volume of the fuel at, for example, a desired flow rate, to a fuel manifold 236 of the turbofan engine 100. The fuel manifold 236 then distributes (provides) the hydrogen fuel received to a plurality of fuel nozzles 442 (see FIG. 6) within the combustion section 150 of the turbofan engine 100 where the hydrogen fuel is mixed with compressed air, and the mixture of hydrogen fuel and compressed air is combusted to generate combustion gases that drive the turbofan engine 100. Adjusting the fuel metering valve 234 changes the volume of fuel provided to the combustion chamber 430 (see FIG. 6) of the combustor 150 and, thus, changes the amount of propulsive thrust produced by the turbofan engine 100 to propel the aircraft 10.

Although the turbofan engine 100 is shown as a direct drive, fixed-pitch turbofan engine 100, in other embodiments, a gas turbine engine may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 171, 173, 175, and 177, discussed above.

Figure 3:
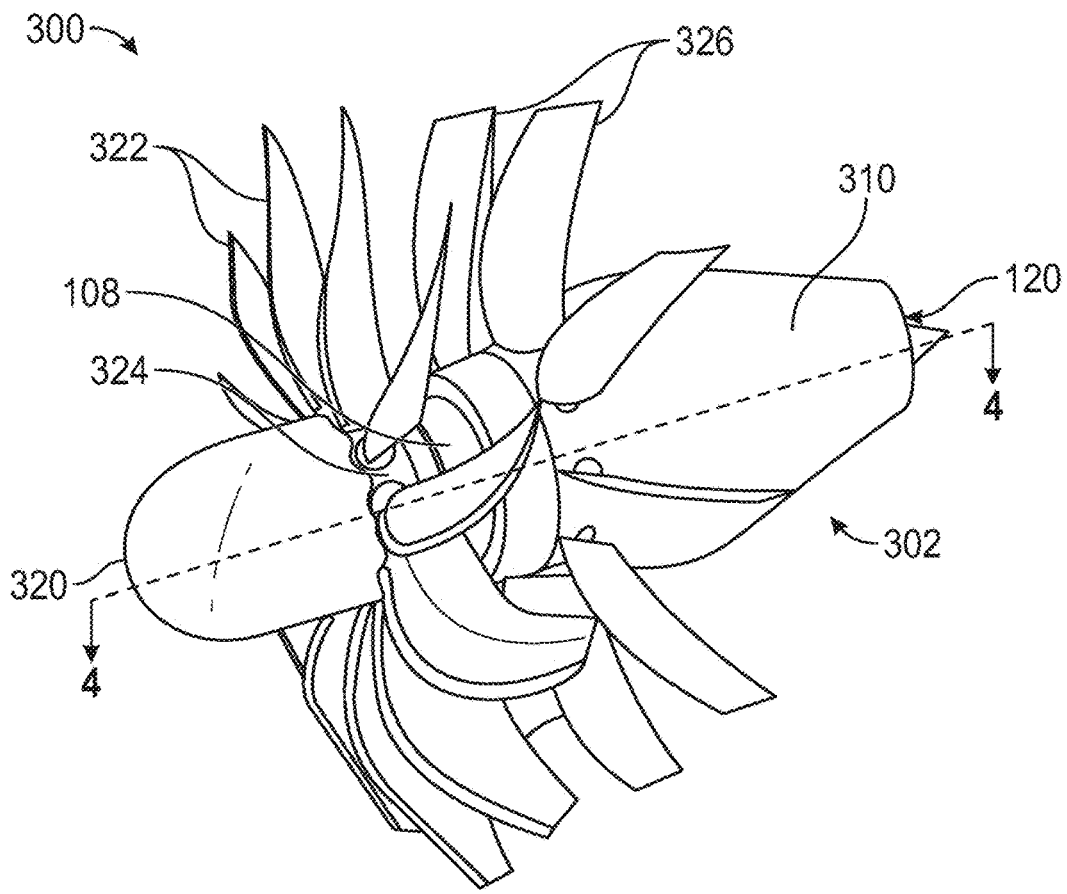
FIG. 3 is a perspective view of an unducted single fan engine that may be used with the aircraft shown in FIG. 1.
Figure 4:
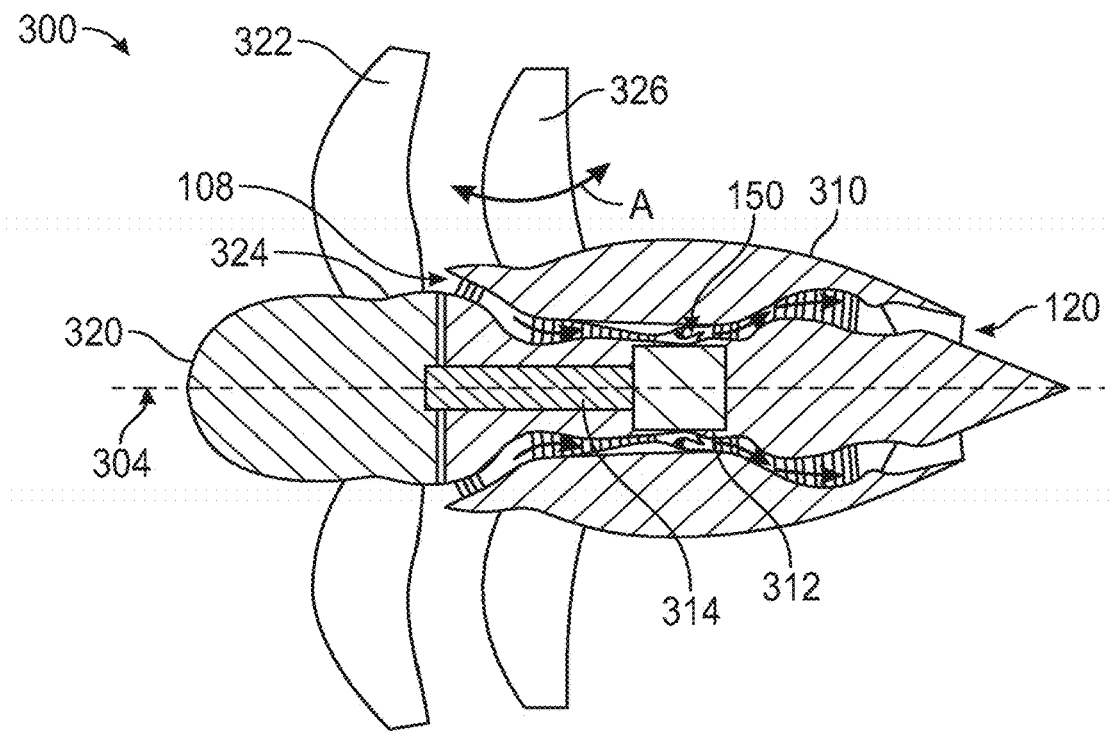
FIG. 4 is a schematic, cross-sectional view, taken along line 4-4 in FIG. 3, of the unducted single fan engine shown in FIG. 3.

The turbofan engine 100 discussed herein is an example of the engine 20 in which the combustors 150 discussed herein may be used. In other embodiments, other suitable engines may be utilized with aspects of the present disclosure. For example, FIGS. 3 and 4 show an unducted single fan (USF) engine 300 that may be used as the engine 20 of the aircraft 10 and implement the fuel system described above, and combustor designs discussed further below. FIG. 3 is a perspective view of the USF engine 300 and FIG. 4 is a cross-sectional view taken along a line 4-4 in FIG. 3.

The USF engine 300 includes a housing 302. The housing 302 may be formed of a nacelle 310 and spinner 320. The nacelle 310 and/or the spinner 320 house internal components of the USF engine 300. For example, the nacelle 310 houses a torque producing system 312 coupled to a shaft 314. The torque producing system 312 in the embodiments discussed herein is a gas turbine engine, such as the turbomachine 104 discussed above with reference to FIG. 2 and, thus, the nacelle 310 of this embodiment is similar to the tubular outer housing 106 discussed above. As the turbomachine 104 used as the torque producing system 312 of the USF engine has the same or similar components and features as the turbomachine 104 discussed above, a detailed description of the components of the turbomachine 104 used in of the USF engine 300 is omitted.

The torque producing system 312 and the shaft 314 are configured to operate (e.g., to rotate) the spinner 320. One or more fan blades 322 are coupled to the spinner 320. More specifically, the spinner 320 includes a fan hub 324, and the fan blades 322 are coupled to the fan hub 324. The spinner 320 rotates with respect to the nacelle 310. Coupled to the nacelle 310 may be one or more outlet guide vanes 326. In this embodiment, the outlet guide vanes 326 are positioned aft of the fan blades 322. During operation, the one or more fan blades 322 (by virtue of the connection to the spinner 320) rotate circumferentially around a longitudinal centerline 304, in this embodiment, and the nacelle 310 is stationary such that the one or more outlet guide vanes 326 do not rotate around the longitudinal centerline 304 and are, thus, stationary with respect to rotation about the longitudinal centerline 304. Although the outlet guide vanes 326 are stationary with respect to the longitudinal centerline 304, the outlet guide vanes 326 are capable of being rotated or moved with respect to the nacelle 310, for example, in the direction A of FIG. 4.

During operation of the USF engine 300, air flows from the left side of FIG. 4 toward the right side of FIG. 4. A portion of the air flow may flow past the fan blades 322 and the outlet guide vanes 326. A portion of the air flow may enter the nacelle 310 through the annular inlet 108 to be mixed with the hydrogen fuel for combustion in a combustor 150 of the USF engine 300 and exit through an outlet 120. The outlet guide vanes 326 may be movable with respect to the nacelle 310 to guide the air flow in a particular direction. Each outlet guide vane 326 may be movable to adjust the lean, pitch, sweep, or any combination thereof, of the outlet guide vane 326.

In the embodiment shown in FIGS. 3 and 4, a forward end or front portion of the housing 302 includes the one or more fan blades 322 and the one or more outlet guide vanes 326. In other embodiments, the one or more fan blades 322 and the one or more outlet guide vanes 326 may have a different arrangement with respect to the housing 302. For example, the one or more fan blades 322 and the one or more outlet guide vanes 326 may be located on an aft end or rear portion of the housing 302, such as coupled to a rear portion of the housing 302.

In other embodiments, an engine according to the disclosure may be configured to have either the stationary vanes positioned forward of the rotating blades 322 (thus, the blades 326 are inlet guide vanes) or both the blades 326 and blades 322 configured to operate in a counter-rotating fashion. Either "pusher" or "puller" configurations are contemplated. In each of these alternative embodiments, the fuel delivery system 200 and combustor 150, as described in great detail below, may be used. An example of a suitable engine configuration for a counter-rotating engine is shown and described in FIG. 1 and col. 3, line 43 through col. 4, line 11 of U.S. Pat. No. 10,800,512, hereby incorporated by reference for all purposes. Alternative embodiments of the USF engine 300 are shown and described in FIGS. 6, 7, and 8 and col. 4, line 51 through col. 5, line 19 of U.S. Pat. No. 10,704,410, hereby incorporated by reference for all purposes.

Figure 5:
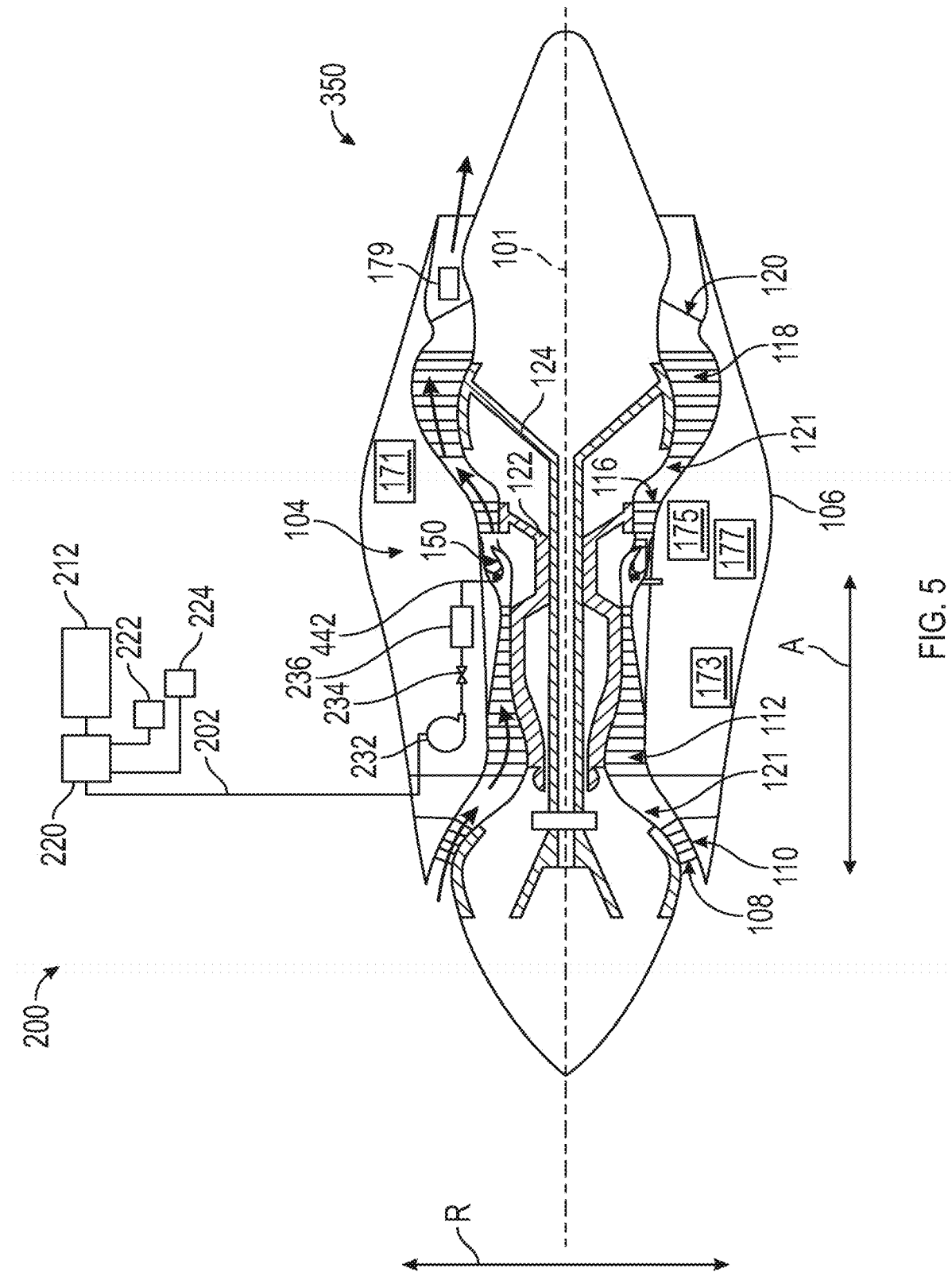
FIG. 5 is a schematic, cross-sectional view, taken along line 2-2 in FIG. 1, of a turbojet engine that may be used with the aircraft shown in FIG. 1.

In further embodiments, a turbojet engine 350 may be used as the engine 20. FIG. 5 is a schematic, cross-sectional view of the turbojet engine 350. The cross-sectional view of FIG. 5 is similar to FIG. 2, which is taken along line 2-2 in FIG. 1. The turbojet engine 350 includes the same or similar components of the turbomachine 104 of the turbofan engine 100 and a detailed description of these components is omitted. An exemplary turbojet engine 350 may not include a fan with bypass duct. An exemplary turbojet engine 350 may have high velocity exhaust from the engine, which produces a majority of the thrust for the turbojet engine 350. In still further embodiments, other suitable gas turbine engines, such as a turboshaft engine, a turboprop engine, and the like, may be utilized with aspects of the present disclosure.

Figure 6:
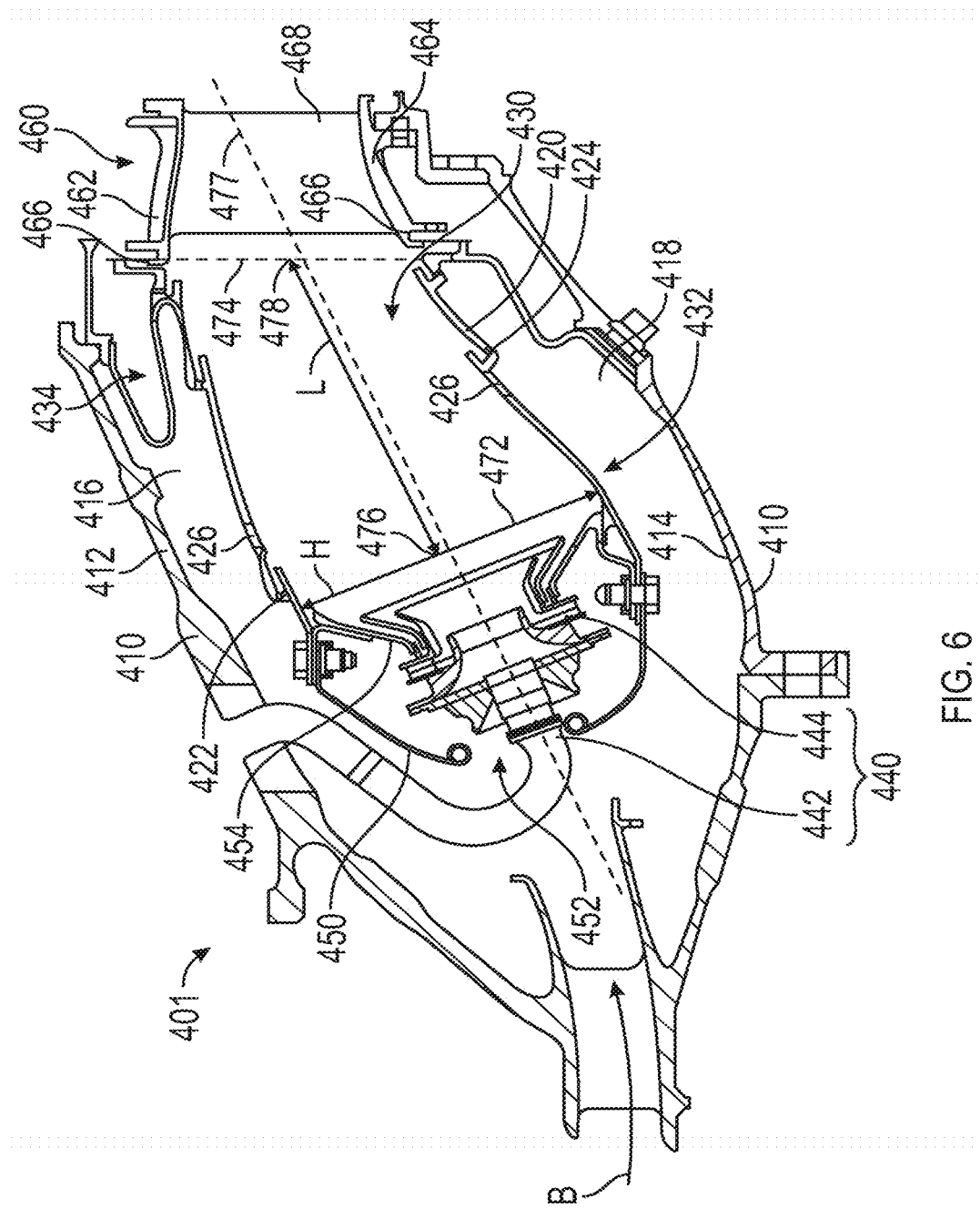
FIG. 6 is a cross-sectional view of a first combustor for the gas turbine engine shown in FIG. 2, showing detail 6 of FIG. 2.
Figure 7:
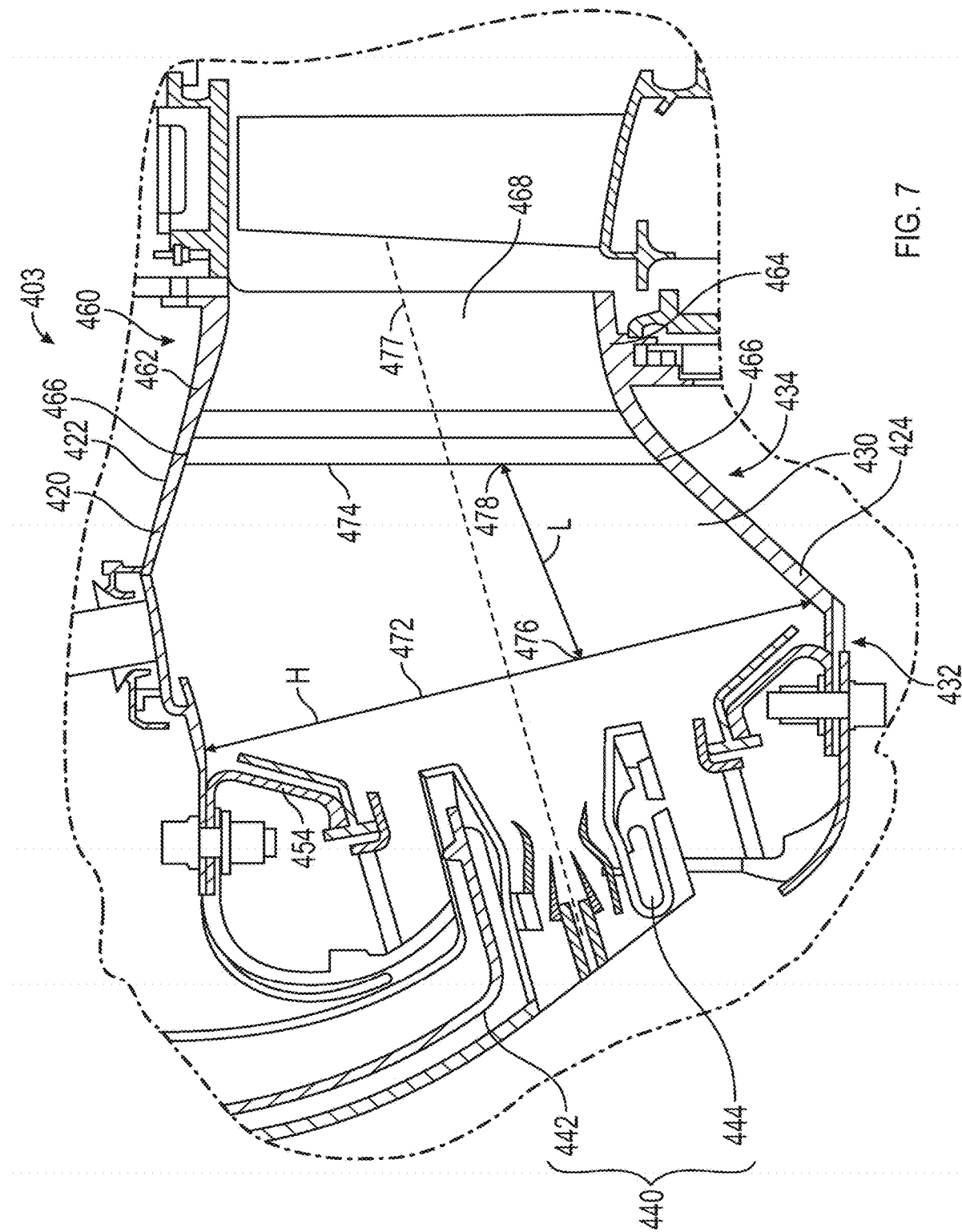
FIG. 7 is a cross-sectional view of a second combustor for the gas turbine engine shown in FIG. 2, showing detail 6 of FIG. 2.
Figure 8:
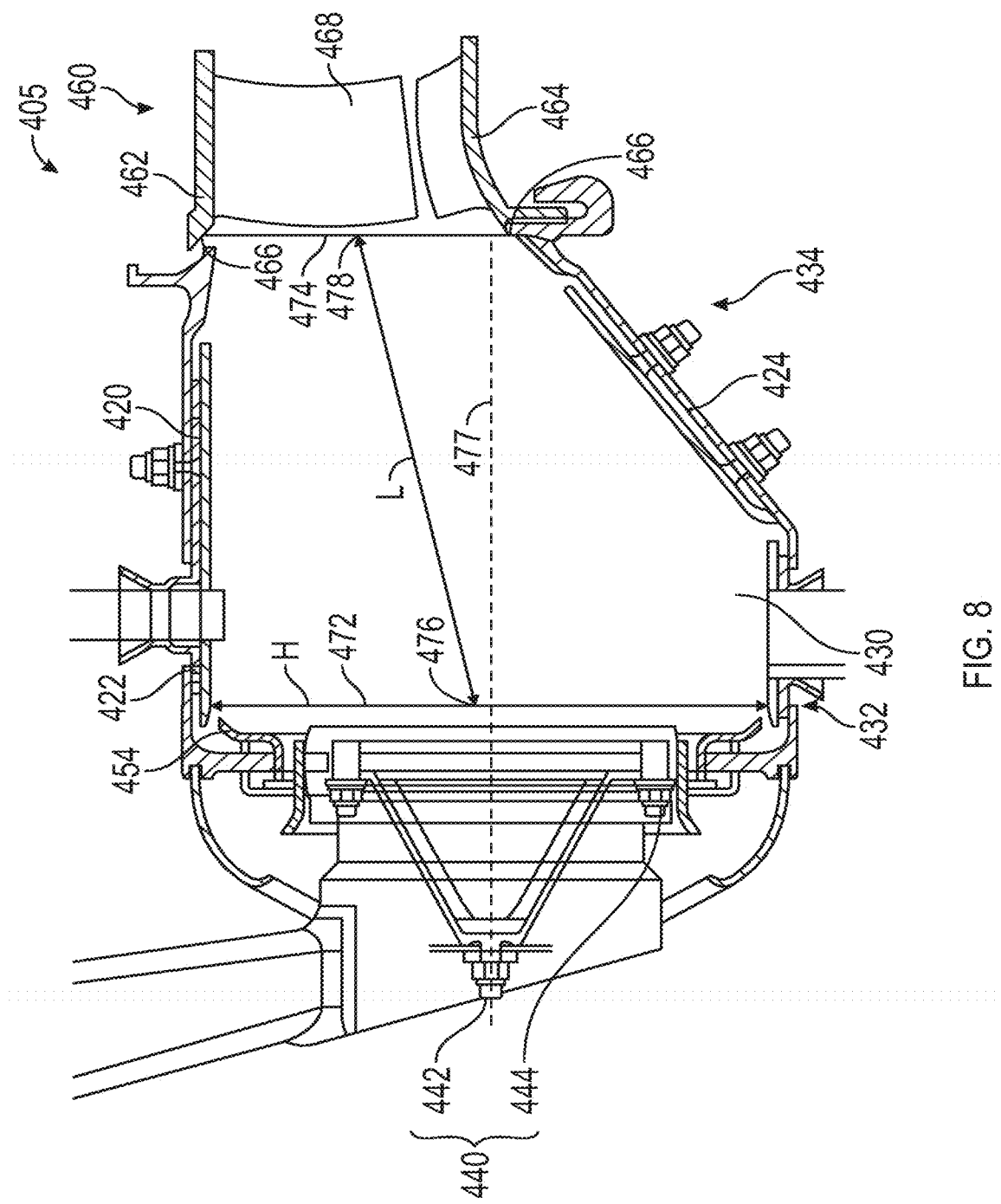
FIG. 8 is a cross-sectional view of a third combustor for the gas turbine engine shown in FIG. 2, showing detail 6 of FIG. 2.
Figure 9:
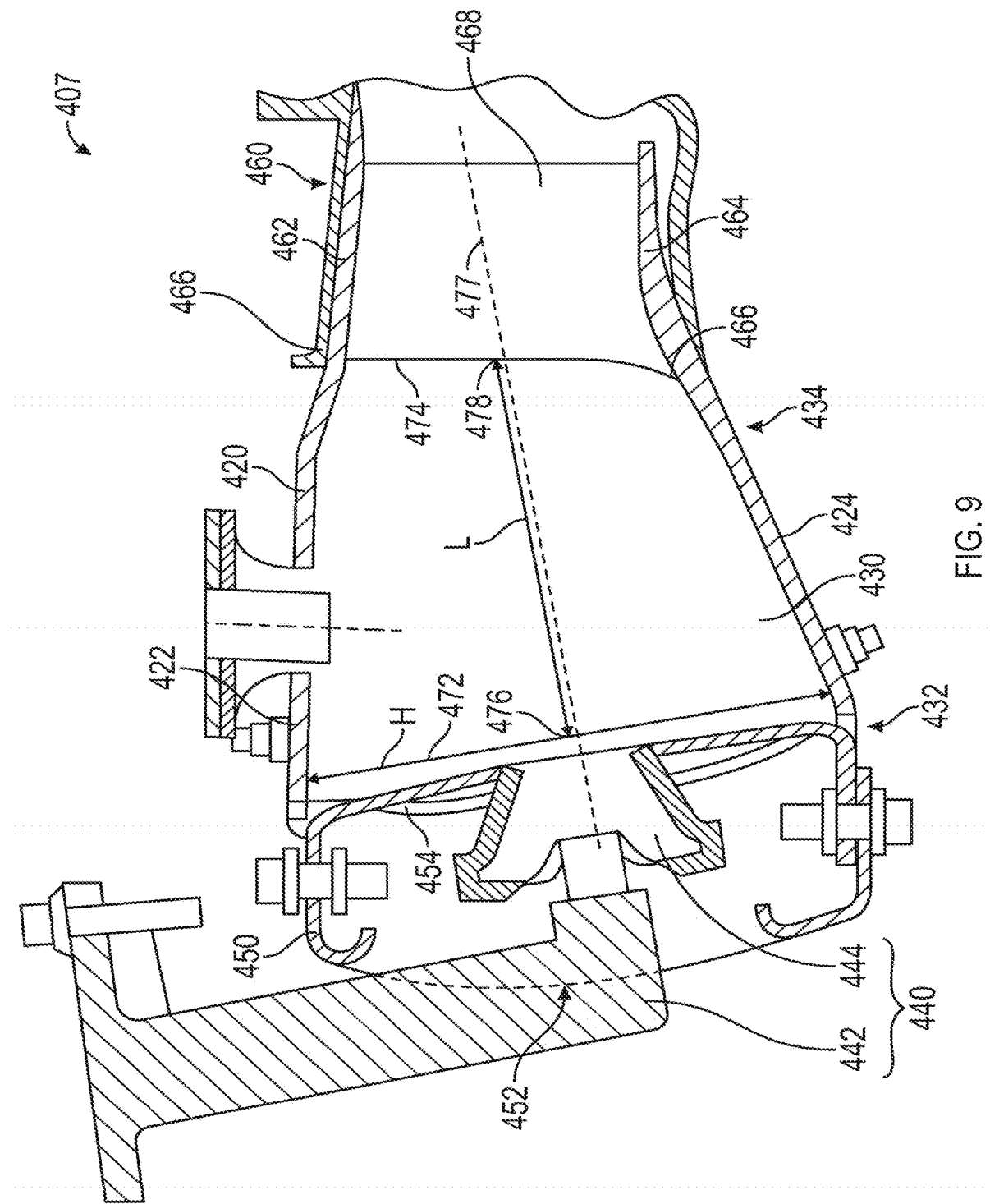
FIG. 9 is a cross-sectional view of a fourth combustor for the gas turbine engine shown in FIG. 2, showing detail 6 of FIG. 2.
Figure 10:
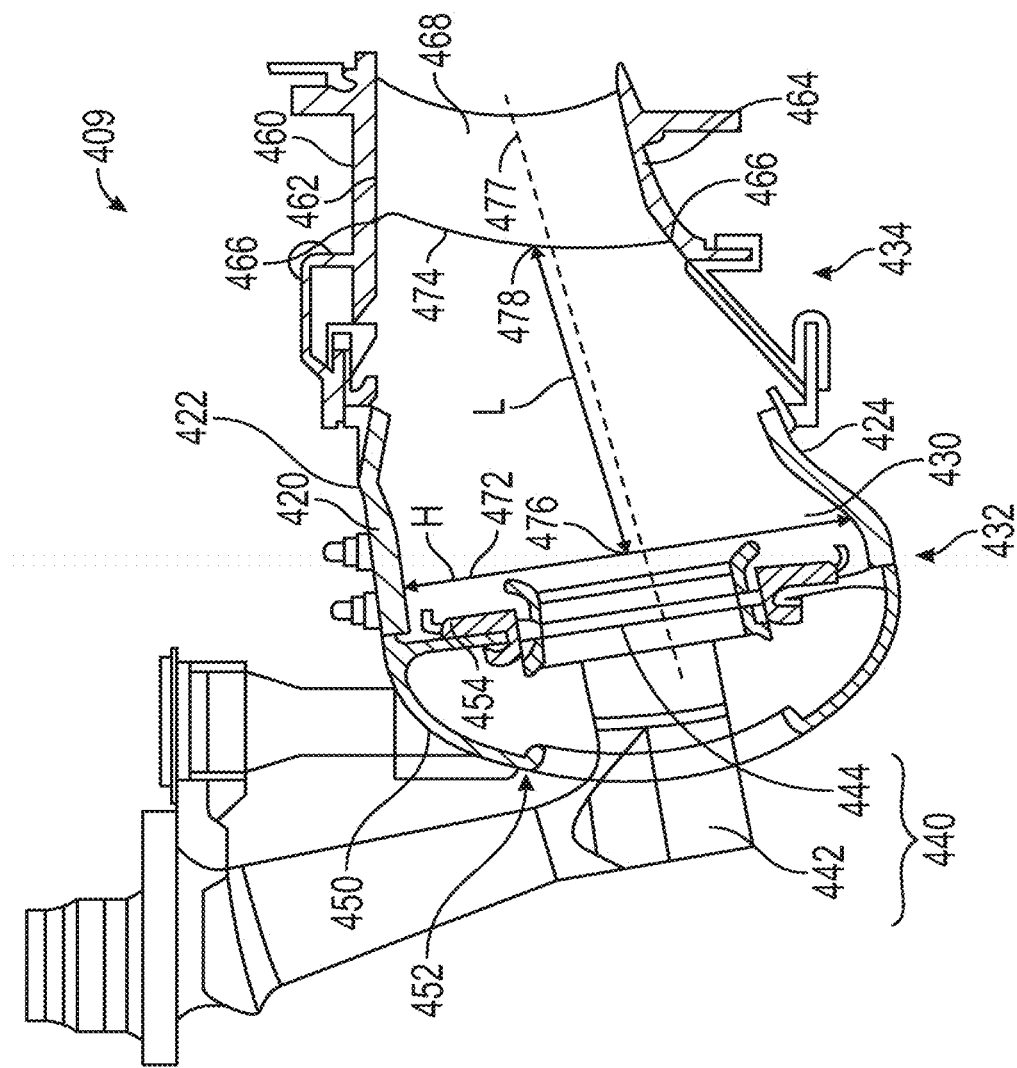
FIG. 10 is a cross-sectional view of a fifth combustor for the gas turbine engine shown in FIG. 2, showing detail 6 of FIG. 2.

As noted above, we conceived of a wide variety of combustors having different shapes and sizes. FIGS. 6 to 10 show various combustor shapes that can suitably be used as the combustor 150 for the gas turbine engines 20 discussed herein. FIGS. 6 to 10 are a detail views showing detail 6 in FIG. 2, and, as FIG. 2 is a cross-sectional view, FIGS. 6 to 10 are also cross-sectional views. FIG. 6 shows a first combustor 401. FIG. 7 shows a second combustor 403. FIG. 8 shows a third combustor 405. FIG. 9 shows a fourth combustor 407. FIG. 10 shows a fifth combustor 409. Although the shapes of these combustors 401, 403, 405, 407, 409 differ, each of these combustors 401, 403, 405, 407, 409 has similar components, and common reference numerals are used in FIGS. 6 to 10 to for the same or similar components of these combustors 401, 403, 405, 407, 409. Accordingly, the following detailed description of the first combustor 401 also applies to the second combustor 403, the third combustor 405, the fourth combustor 407, and the fifth combustor 409. Some components, such as the combustor casing 410, for example, may not be shown in each figure, but such components may nevertheless be applicable to the combustors 403, 405, 407, 409.

As shown in FIG. 6, combustor 401 includes a combustor casing 410 and a combustor liner 420. The combustor casing 410 of this embodiment has an outer casing 412 and an inner casing 414, and the combustor liner 420 of this embodiment has an outer liner 422 and an inner liner 424. A combustion chamber 430 is formed within the combustor liner 420. More specifically, the outer liner 422 and the inner liner 424 are disposed between the outer casing 412 and the inner casing 414. The outer liner 422 and the inner liner 424 are spaced radially from each other such that the combustion chamber 430 is defined therebetween. The outer casing 412 and the outer liner 422 form an outer passage 416 therebetween, and the inner casing 414 and the inner liner 424 form an inner passage 418 therebetween. In this embodiment, the combustor 401 is a single annular combustor, but, in other embodiments, the combustor 401 may be any other combustor, including, but not limited to a double annular combustor.

The combustion chamber 430 has a forward end 432 (downstream end) and an aft end 434 (upstream end). The fuel nozzle 442 is positioned at the forward end 432 of the combustion chamber 430. The fuel nozzle 442 of this embodiment is part of a swirler/fuel nozzle assembly 440. In this embodiment, when the combustor 401 is an annular combustor 150, a plurality of fuel nozzles 442 is arranged in an annular configuration with the plurality of fuel nozzles 442 (the swirler/fuel nozzle assemblies 440) aligned in a circumferential direction of the combustor 401.

As discussed above, the compressor section, the combustor 401, and the turbine section form, at least in part, the core air flow path 121 extending from the annular inlet 108 to the jet exhaust nozzle section 120. Air entering through the annular inlet 108 is compressed by blades of a plurality of fans of the LP compressor 110 and HP compressor 112. A cowl assembly 450 is coupled to the upstream ends of outer liner 422 and the inner liner 424, respectively. An annular opening 452 formed in the cowl assembly 450 enables compressed air from the compressor section (indicated by arrow B) to enter the combustor 401. The compressed air flows through the annular opening 452 to support combustion. Another portion of the compressed air flows around the outside of the combustor liner 420 through the outer passage 416 and the inner passage 418. This air is introduced into the combustion chamber 430 through a plurality of circumferentially spaced dilution holes 426 formed in the combustor liner 420 at positions downstream of the fuel nozzle 442.

An annular dome plate 454 extends between, and is coupled to, outer liner 422 and the inner liner 424 near their upstream ends. The plurality of circumferentially spaced swirler/fuel nozzle assemblies 440 is coupled to dome plate 454. Each swirler/fuel nozzle assembly 440 receives compressed air from the annular opening 452. The swirler/fuel nozzle assembly 440 includes a swirler 444 that is used to generate turbulence in the air. The fuel nozzle 442 injects fuel into the turbulent air flow and the turbulence promotes rapid mixing of the fuel with the air. The resulting mixture of fuel and compressed air is discharged into combustion chamber 430 and combusted in the combustion chamber 430, generating combustion gases (combustion products), which accelerate as the combustion gases leave the combustion chamber 430.

A turbine nozzle 460 is disposed at the outlet of the combustion chamber 430. The turbine nozzle 460 may be a stage 1 turbine nozzle. The turbine nozzle 460 is coupled to outer liner 422 and the inner liner 424 at the downstream (aft) ends of each of the outer liner 422 and the inner liner 424. The turbine nozzle 460 of this embodiment includes an outer band 462 and an inner band 464 coupled to outer liner 422 and the inner liner 424, respectively. The turbine nozzle 460 also includes a leading edge 466, which in this embodiment is the location where the turbine nozzle 460 is coupled to outer liner 422 and the inner liner 424, and the outer band 462 and the inner band 464 each has the leading edge 466. The turbine nozzle 460 further includes a plurality of circumferentially spaced vanes 468 extending between the outer band 462 and the inner band 464. The vanes 468 extend in a generally radial direction. The vanes 468, and the turbine nozzle 460, is a static component and the vanes 468 may be cured to direct (e.g., spin or swirl) the combustion gases to turn the turbines (e.g., drive the turbine blades) of the first stage of the HP turbine 116. In this embodiment, the turbine section is a multi-stage turbine and these combustion gases will drive subsequent stages of the HP turbine 116 and the LP turbine 118. The turbine nozzle 460 may, thus, also be referred to as a stage one nozzle (SIN). As discussed above the HP turbine 116 and the LP turbine 118, among other things, drive the LP compressor 110 and HP compressor 112.

As noted above, we realized that when designing hydrogen fuel combustor to meet NOx emission targets, the combustor residence time needs to be reduced. We sized the combustor 401, and more specifically, the combustor liner 420 for various gas turbine engines and flow rates. These different embodiments are shown below in Table 1 and were developed for different bypass ratios and thrust classes of engines, characterized by the core airflow. In particular, we considered the height H, also referred to as burner dome height, of the combustion chamber 430 and the length L, also referred to as burner length, of the combustion chamber. Diluents could be used to suppress the temperature, and, thus, NOx production, in the combustion chamber 430 when hydrogen is used as the fuel. With the combustor sized as described in these embodiments, hydrogen fuel can be used without the need of diluents. In some embodiments, no diluent is added to the combustion chamber 430 and the fuel is substantially completely diatomic hydrogen without diluent. As used herein, the term "substantially completely," as used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule.

FIGS. 6 to 10 illustrate how the height H and length L may be determined for the different shapes of combustion liners 420 shown in these figures. The height H of the combustion chamber 430 is taken at the forward end 432 of the combustion chamber 430. The height H is the maximum height between an inner surface of the outer liner 422 and an inner surface of the inner liner 424 at the forward end 432 of the combustion chamber 430. The height H is measured along a line (referred to as a forward line 472, herein) that is generally orthogonal the inner surfaces of the outer liner 422 and the inner liner 424. The forward line 472 may be orthogonal to a central axis 477 of the fuel nozzle assembly 440 and/or the fuel nozzle 442. In this manner, the height H may be orthogonal to the central axis 477. In some embodiments, the height H measured using with the forward line is the maximum height of the combustion chamber 430 and may also be the maximum dome height of the combustion chamber 430.

The length L of the combustion chamber 430 is the distance between forward line 472 and the leading edge 466 of the turbine nozzle 460. As with the height H, a line (referred to as the aft line 474, herein) can be drawn from the leading edge 466 at the outer liner 422 and leading edge at the inner liner 424. Each of the forward line 472 and the aft line 474 has a midpoint (midpoint 476 and midpoint 478, respectively) that is halfway between the outer liner 422 and the inner liner 424. The length L can be measured from the midpoint 476 of the forward line 472 to the midpoint 478 of the aft line 474. The midpoint 478 may be the midspan height of the turbine nozzle 460.

When developing a gas turbine engine, the interplay between components can make it particularly difficult to select or to develop one component during engine design and prototype testing, especially, when some components are at different stages of completion. For example, one or more components may be nearly complete, yet one or more other components may be in an initial or preliminary phase such that only one (or a few) design parameters are known. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan 126 design, the HP compressor 112 design, and/or the LP compressor 110 design may not be known, but such components impact the core air flow through the core air flow path 121, and, thus, may influence the design of the combustion chamber 430.

We desire to narrow the range of configurations or combination of features that can yield favorable results given the constraints of the design, feasibility, manufacturing, certification requirements, etc., early in the design selection process to avoid wasted time and effort. During the course of the evaluation of different embodiments as set forth above, we, the inventors, discovered, unexpectedly, that there exists a relationship between the burner length and the burner dome height, which uniquely identifies a finite and readily ascertainable (in view of this disclosure) number of embodiments suitable for a particular architecture that can meet NOx emissions for hydrogen fuel and provide desired flame residence times. This relationship is referred to by the inventors as the combustor size rating (CSR) (in), and is defined according to the following relationship (1) between burner length L (in) and burner dome height H (in):

$$\text{Combuster Size Rating} = (L)^2/(H) \qquad (1)$$

As discussed further below, we have identified a range of the Combustor Size Ratings that enable a combustion chamber 430 to be designed for a gas turbine engine 20 using hydrogen fuel. This relationship is applicable over a wide range of thrust class and engine designs. Using this unique relationship, a combustor 150 design can be developed early in the design process that meets NOx emissions targets and reduces engine weight for gas turbine engines using hydrogen fuel.

Table 1 describes exemplary embodiments 1 to 24 identifying the CSR for various hydrogen fuel burning engines. The embodiments 1 to 24 may be engines with either rich burn combustors or lean burn combustors. Each of embodiments 1 to 24 burns hydrogen fuel. Embodiments 1 to 24 may represent any of the engines described with respect to FIGS. 1 to 5 and can be applied to any of the combustion chamber 430 shapes shown in FIGS. 6 to 10. In Table 1, the CSR is determined based on the relationship (1) described above. A core air flow parameter (CAFP) (kN) is defined according to the following relationship (2) between thrust (kN) and bypass ratio, both at take off.

$$\text{Core Air Flow Parameter} = \frac{\text{Thrust}}{\text{Bypass Ratio}} \qquad (2)$$

The burner length is the length L identified with respect to FIGS. 6 to 10, and in the embodiments 1 to 24 is between two inches and six inches. In embodiments 1 to 24, the burner length squared may be between six square inches and thirty-five square inches. The burner dome height is the height H identified with respect to FIGS. 6 to 10, and in the embodiments 1 to 24 is between two and one half inches and six inches.

TABLE 1

| Embodiment | Combustor Size Rating (in) | Core Air Flow Parameter (kN) | Thrust (kN) | Bypass Ratio |
|---|---|---|---|---|
| 1 | 4.30 | 38.16 | 332.39 | 8.71 |
| 2 | 6.67 | 49.85 | 254.26 | 5.10 |
| 3 | 6.67 | 53.44 | 272.53 | 5.10 |
| 4 | 6.67 | 51.18 | 261.03 | 5.10 |
| 5 | 6.67 | 52.36 | 267.03 | 5.10 |
| 6 | 4.69 | 21.07 | 120.10 | 5.70 |
| 7 | 4.69 | 23.80 | 121.40 | 5.10 |
| 8 | 3.01 | 12.58 | 64.53 | 5.13 |
| 9 | 3.01 | 12.18 | 62.49 | 5.13 |
| 10 | 3.00 | 16.44 | 83.70 | 5.09 |
| 11 | 3.00 | 15.20 | 82.10 | 5.40 |
| 12 | 3.00 | 14.27 | 84.20 | 5.90 |
| 13 | 3.00 | 14.27 | 84.20 | 5.90 |
| 14 | 3.00 | 14.27 | 84.20 | 5.90 |
| 15 | 2.12 | 36.55 | 321.60 | 8.80 |
| 16 | 2.12 | 39.23 | 345.20 | 8.80 |
| 17 | 2.12 | 40.65 | 349.20 | 8.59 |
| 18 | 2.12 | 40.65 | 349.20 | 8.59 |
| 19 | 2.12 | 37.34 | 299.81 | 8.03 |
| 20 | 1.67 | 13.63 | 143.10 | 10.50 |
| 21 | 1.94 | 51.51 | 489.30 | 9.50 |
| 22 | 5.51 | 40.89 | 363.90 | 8.90 |
| 23 | 2.46 | 12.72 | 147.28 | 11.58 |
| 24 | 2.70 | 5.00 | 150.00 | 30.00 |

The length L may be between 2.63 inches and 5.60 inches. The length L may be between two inches and three inches. The length L may be between two and one half inches and three and one half inches. The height H may be between 2.80 inches and 5.60 inches. The height H may be between two and one half inches and six inches. The height H may be between two and one half inches and five inches. The height H may be between four inches and five inches. The burner length squared may be between 6.89 inches and 31.36 inches. The burner length squared may be between six square inches and thirty-five square inches. The burner length squared may be between six square inches and twenty square inches. The burner length squared may be between six square inches and twelve square inches. The burner length squared may be between eight square inches and twelve square inches. The burner length squared and the height may be any values such that the CSR is less than seven inches. The burner length squared and the height may be any values such that the CSR is less than six inches.

Figure 11:
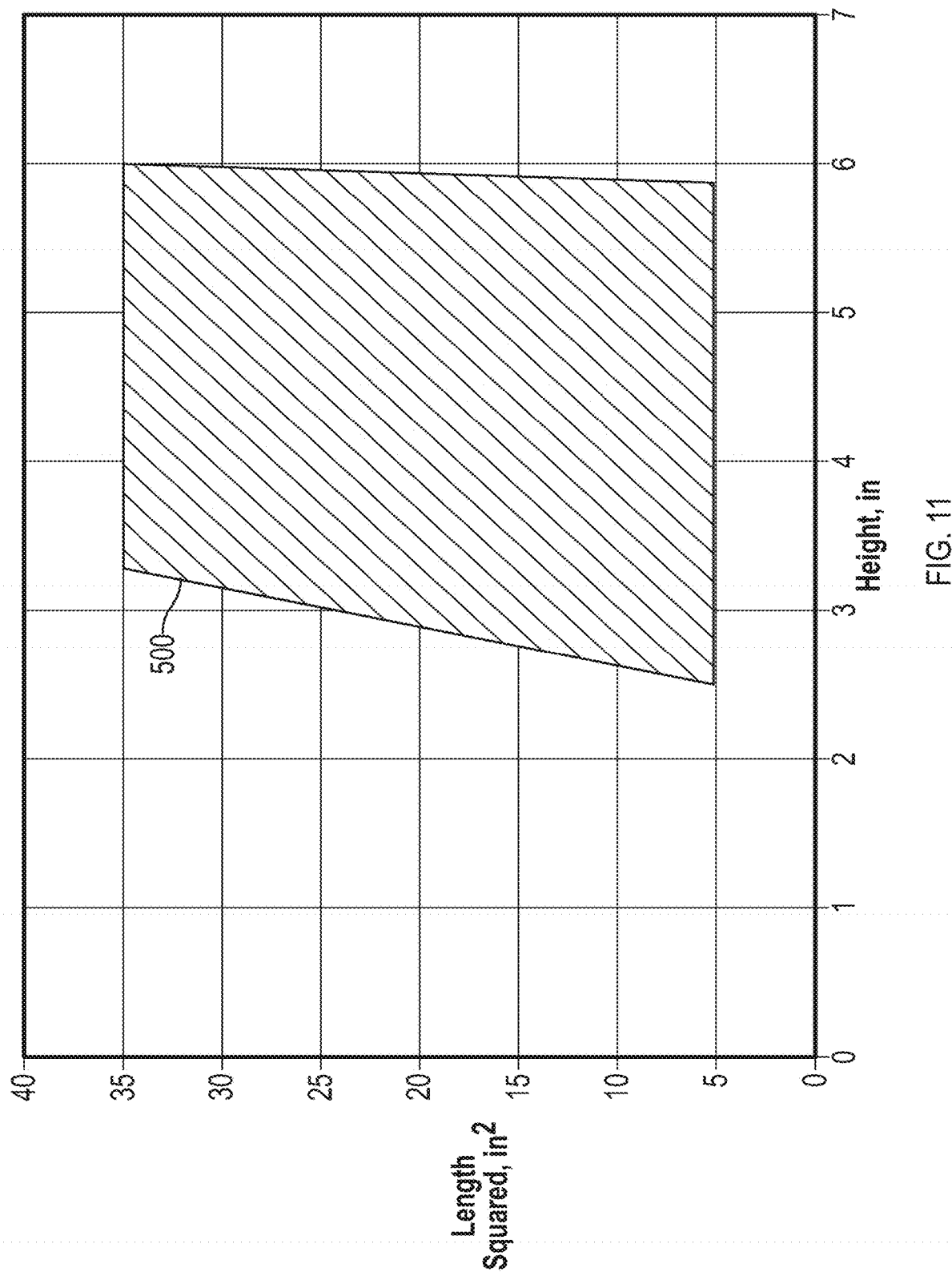
FIG. 11 is a graph illustrating combustor length (squared) as a function of combustor height, according to embodiments of the present disclosure.
Figure 12:
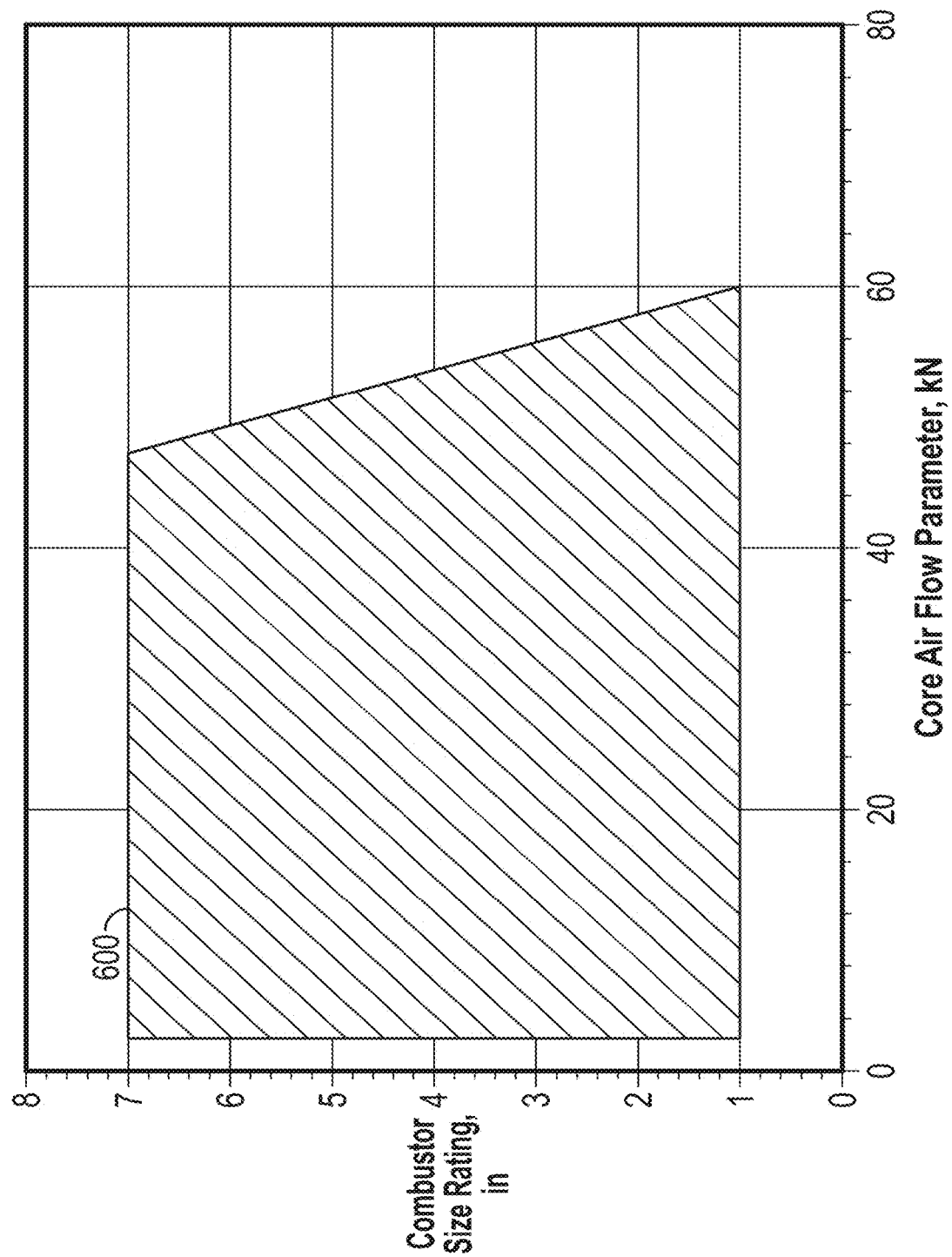
FIG. 12 is a graph illustrating combustor size rating as a function of core air flow parameter in engine gas turbine engines using hydrogen fuel, according to embodiments of the present disclosure.

FIG. 11 represents, in graph form, the burner length, squared, as a function of the burner dome height. FIG. 11 shows that the burner length, squared, may be changed based on the burner dome height. An area 500 may present the boundaries of burner length, squared, as a function of burner dome height in which a particular combustor is designed. FIG. 12 represents, in graph form, the CSR as a function of core air flow parameter. Table 1 and FIG. 12 show that CSR may be changed based on a thrust class, as characterized by the core air flow parameter, of an engine. An area 600 may present the boundaries of CSR as a function of the core air flow parameter in which a particular combustor is designed.

As shown in FIG. 12, the CSR is less than seven inches for every core air flow. That is, the CSR is less than seven inches for every thrust class of engine. The CSR may be between 1.67 inches and 6.67 inches. The CSR may be between one inch and seven inches. The CSR may be between one and one half inches and seven inches. The CSR may be between two inches and seven inches. The CSR may be between two inches and six inches. The CSR may be between one inches and five inches. The CSR may be between two inches and five inches. The CSR may be between three inches and five inches. The core air flow parameter may be less than sixty kN. The core air flow parameter may be between five kN and 53.44 kN. The core air flow parameter may be between two and one half kN and sixty kN. The core air flow parameter may be between ten kN and twenty kN. The core air flow parameter may be between thirty kN and forty-five kN.

With continued reference to FIG. 12, the CSR may be a function of the core air flow parameter. The CSR may be based on a thrust of the gas turbine engine. The CSR may be between one inch and seven inches at a core air flow parameter between two and one half kN and sixty kN. The CSR may be between two inches and three and one quarter inches at a core air flow parameter between two and one half kN and fifty kN. The thrust may be between sixty kN and five hundred kN. The thrust may be between 62.49 kN and 489.30 kN. The CSR is defined by a relationship of the burner length, squared, and the burner dome height.

In an extension of the concepts disclosed hereinabove, also provided herein are combustors that include a fuel nozzle. It has been determined that hydrogen fuel results in higher combustion temperatures as compared to combustible hydrocarbon liquid fuel and that NOx emissions are sensitive to factors including combustor residence times, the present disclosure allows for fuel nozzle structures configured for use with such higher combustion temperatures.

Hydrogen fuels can eliminate carbon emissions but generate challenges relating to flame holding due to higher flame speed. Current combustors include a durability risk when using such fuels or other high-temperature fuels due to flame holding on combustor components resultant of flashback. Various embodiments, as described herein and as shown in the figures are combustors including fuel nozzles designed to achieve desired levels of mixing while reducing wake, turbulence, or other non-uniformities in flow. The reduction in wake in turn mitigates flashback.

Further, the fuel nozzle as described herein, provides a structure that is designed for the heightened temperatures. The fuel nozzle embodiments described herein provide for maintaining a high axial velocity for both fuel and airflow. The high axial velocity mitigates the occurrence of flame holding, which permits the use of higher temperature fuels, such as hydrogen fuels. The described fuel nozzles are particularly beneficial when utilizing hydrogen fuel, which burns hotter than traditional fuels, as the assembly permits an increase in fuel efficiency and allows for NOx emissions to be met.

Figure 13:
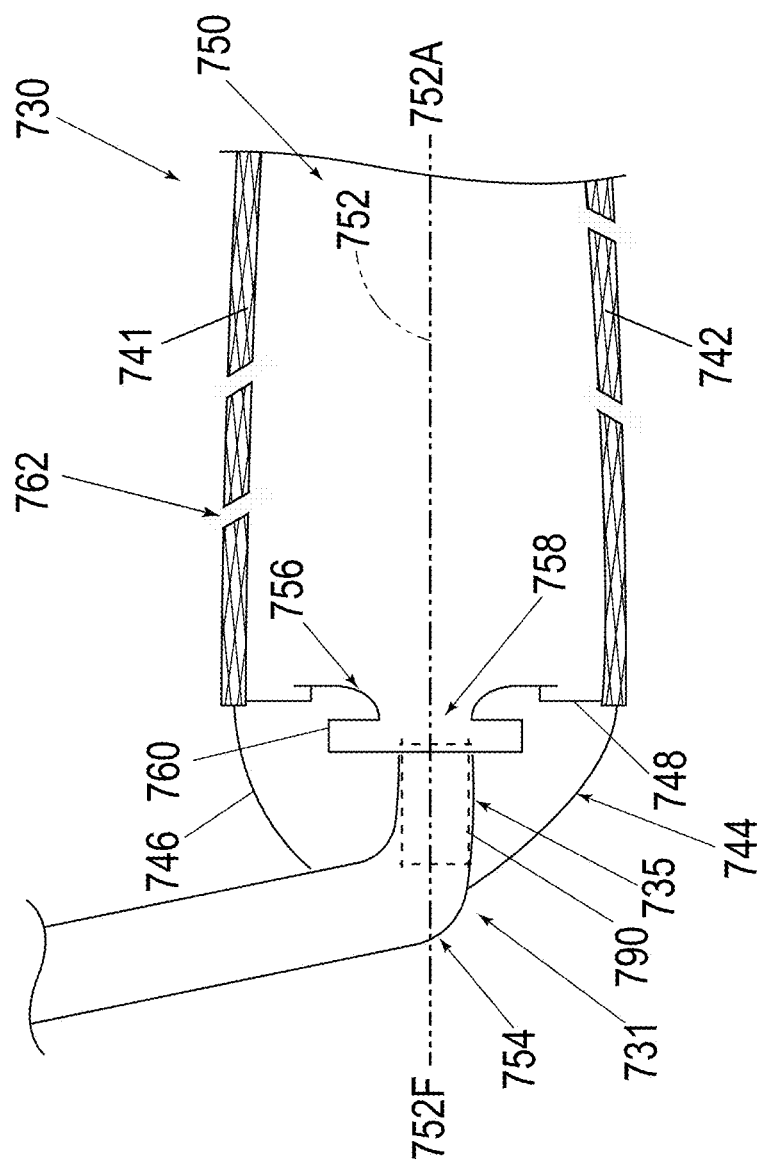
FIG. 13 is a cross-sectional view of a combustor in accordance with various aspects described herein.

As noted above, a wide variety of combustors having different shapes and sizes have been conceived. It is further contemplated that any of the above described combustors can include a fuel assembly. By way of non-limiting example, FIG. 13 illustrates a combustor 730 having a fuel assembly 735 configured to provide fuel to the combustor 730. The fuel assembly 735 can at least partially form the fuel injector 731. In some examples, the fuel assembly 735 can include an annular arrangement of fuel nozzles. It should be appreciated that such fuel nozzles can be organized in any suitable arrangement, pattern, grouping, or the like.

Dome assembly 744 can include a dome wall 746 and a deflector 748. The combustor liner 740 and dome assembly 744 can collectively at least partially define the combustion chamber 750 about a longitudinal axis 752. The longitudinal axis 752 can extend between a forward direction 752F and an aft direction 752A as shown.

At least one fuel supply 754 can be fluidly coupled to the combustion chamber 750 to supply fuel to the combustor 730. The fuel supply 754 is illustrated as being disposed within the dome assembly 744 to define a fuel outlet 758. Air can also be supplied or provided to the combustion chamber 750 by way of the fuel outlet 758. More specifically, the fuel outlet 758 can provide a fuel-air mixture to the combustion chamber 750. For example, a fuel mixer 790 can be provided and the fuel mixer 790 can be configured to form a mixture of fuel and air and supply the mixture to the combustion chamber 750. It is contemplated that multiple fuel injectors or premixers can be located on the dome wall 746 although this need not be the case. In such an instance the multiple fuel injectors or premixers can be arranged in discrete clusters or groups on the dome wall 746.

In a non-limiting example, a flare cone 756 can be provided downstream of the fuel supply 754. A swirler 760 can also be provided at the fuel assembly 735 to swirl incoming air in proximity to fuel exiting the fuel supply 754 and provide a homogeneous mixture of air and fuel entering the combustor 730.

A set of dilution holes 762 can be provided in the combustor liner 740, the set of dilution holes 762 configured to direct air into the combustion chamber 750 for temperature control, flame shaping, fuel-air mixing, or the like. Any number of dilution holes can be provided in the set of dilution holes 762. The set of dilution holes 762 can have any suitable patterning or arrangement over the combustor liner 740, including linear rows, irregular groups, variable hole diameters, or the like, or combinations thereof. It is also contemplated that the combustor 730 can be formed without any dilution holes.

Figure 14:
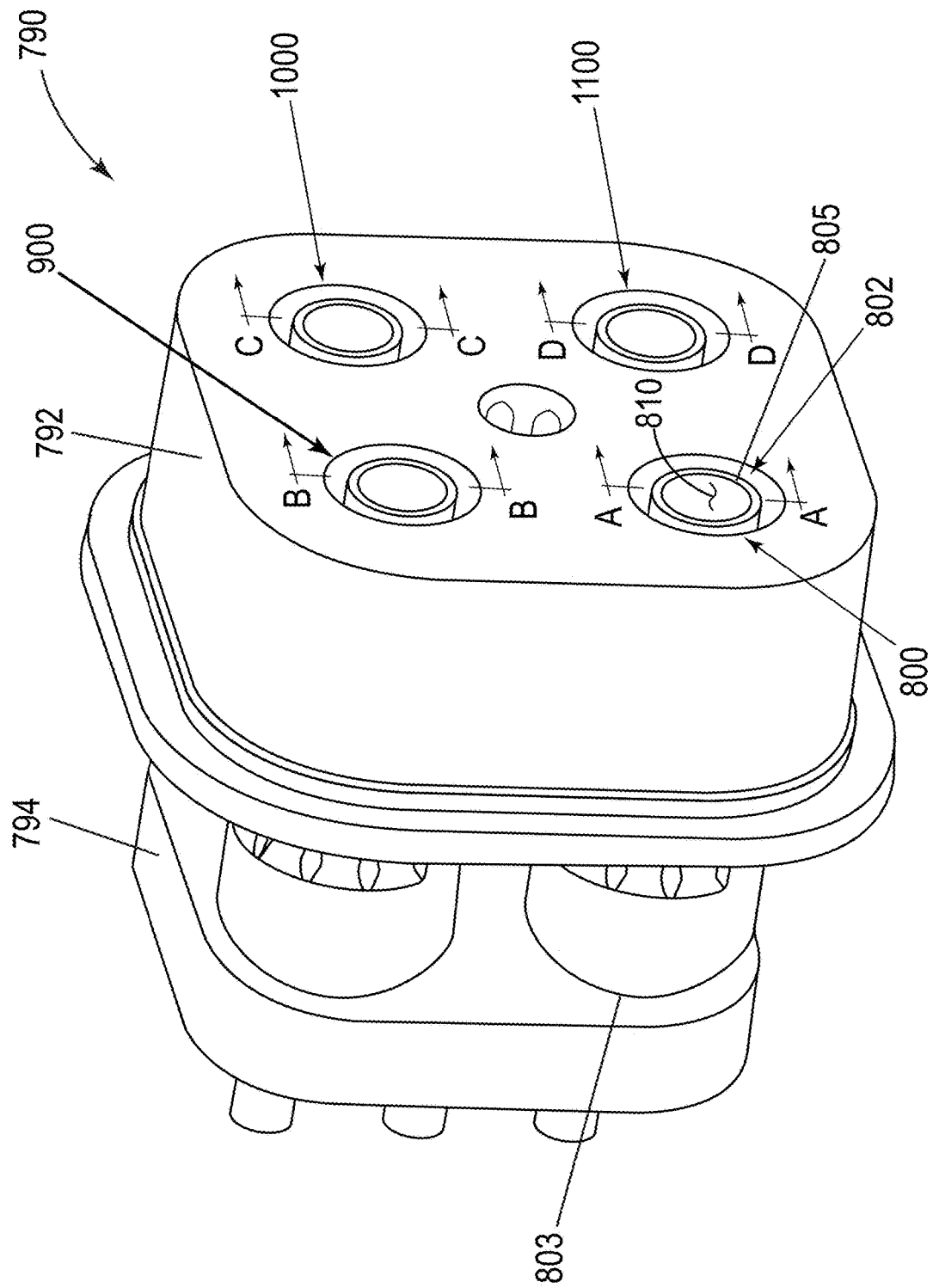
FIG. 14 is a perspective view of a fuel mixer that can be utilized in the combustor of FIG. 13 illustrating at least one fuel nozzle assembly in accordance with various aspects described herein.

FIG. 14 illustrates an exemplary fuel mixer 790 having a housing 792 and a base 794. The fuel mixer 790 can also include at least one fuel nozzle assembly. In the illustrated example, the at least one fuel nozzle assembly includes a first fuel nozzle assembly 800, a second fuel nozzle assembly 900, a third fuel nozzle assembly 1000, and a fourth fuel nozzle assembly 1100. However, this need not be the case and it will be understood that any number of fuel nozzle assemblies can be provided, including only one.

With reference to the first fuel nozzle assembly 800, the fuel nozzle assembly 800 can include a fuel nozzle 802 defining an upstream end 803 and a downstream end 805. The at least one fuel nozzle assembly 800 can be carried, supported, or enclosed by the housing 792 at the downstream end 805 and coupled to the base 794 at the upstream end 803. A mixture outlet 810 can also be located at the downstream end 805 of the fuel nozzle assembly 800 as shown.

The second fuel nozzle assembly 900, third fuel nozzle assembly 1000, and fourth fuel nozzle assembly 1100 can be similar to the first fuel nozzle assembly 800. Like parts of the second fuel nozzle assembly 900, third fuel nozzle assembly 1000, and fourth fuel nozzle assembly 1100 will be identified herein with like numerals increased by 100, 200, and 300, respectively, with it being understood that the description of the like parts of the fuel nozzle assembly 800 applies to the second fuel nozzle assembly 900, third fuel nozzle assembly 1000, and fourth fuel nozzle assembly 1100, except where noted. It is contemplated that each of the first fuel nozzle assembly 800, second fuel nozzle assembly 900, third fuel nozzle assembly 1000, and fourth fuel nozzle assembly 1100 can be coupled to the same base 794 in one non-limiting example. It is also contemplated that the fuel mixer 790 can include any or all of the first, fuel nozzle assembly 800, second fuel nozzle assembly 900, third fuel nozzle assembly 1000, and fourth fuel nozzle assembly 1100 with or without the housing 792 or base 794. While the fuel mixer 790 is described as including four fuel nozzle assemblies having different configurations, it will be understood that the fuel mixer 790 can include multiple identical fuel nozzle assemblies, or fuel nozzle assemblies having combinations of features or aspects of the first, fuel nozzle assembly 800, second fuel nozzle assembly 900, third fuel nozzle assembly 1000, and fourth fuel nozzle assembly 1100 described herein, or the like.

Figure 15:
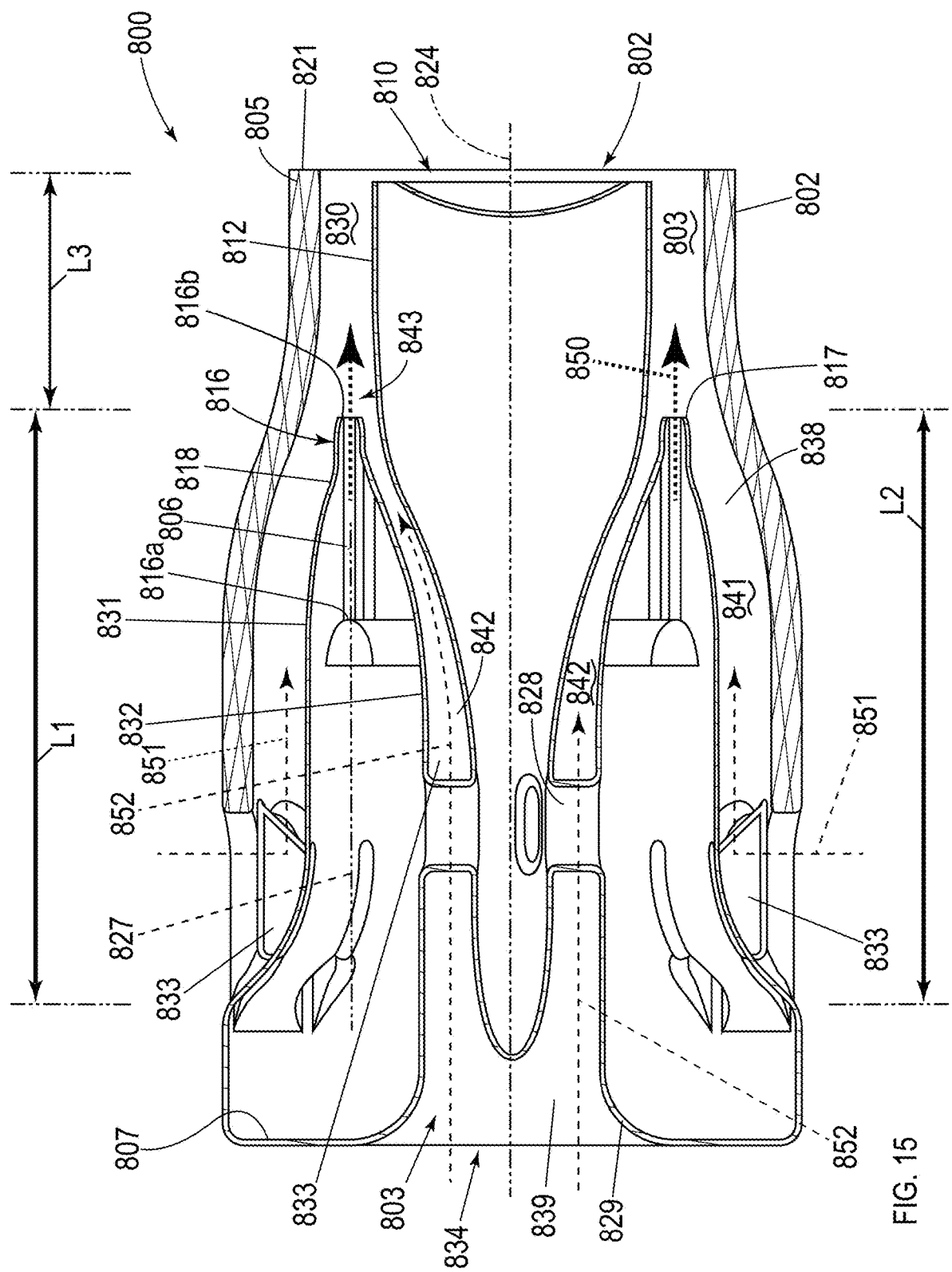
FIG. 15 is a cross-sectional view of a first fuel nozzle assembly taken along line A-A of FIG. 14 in accordance with various aspects described herein.
Figure 16:
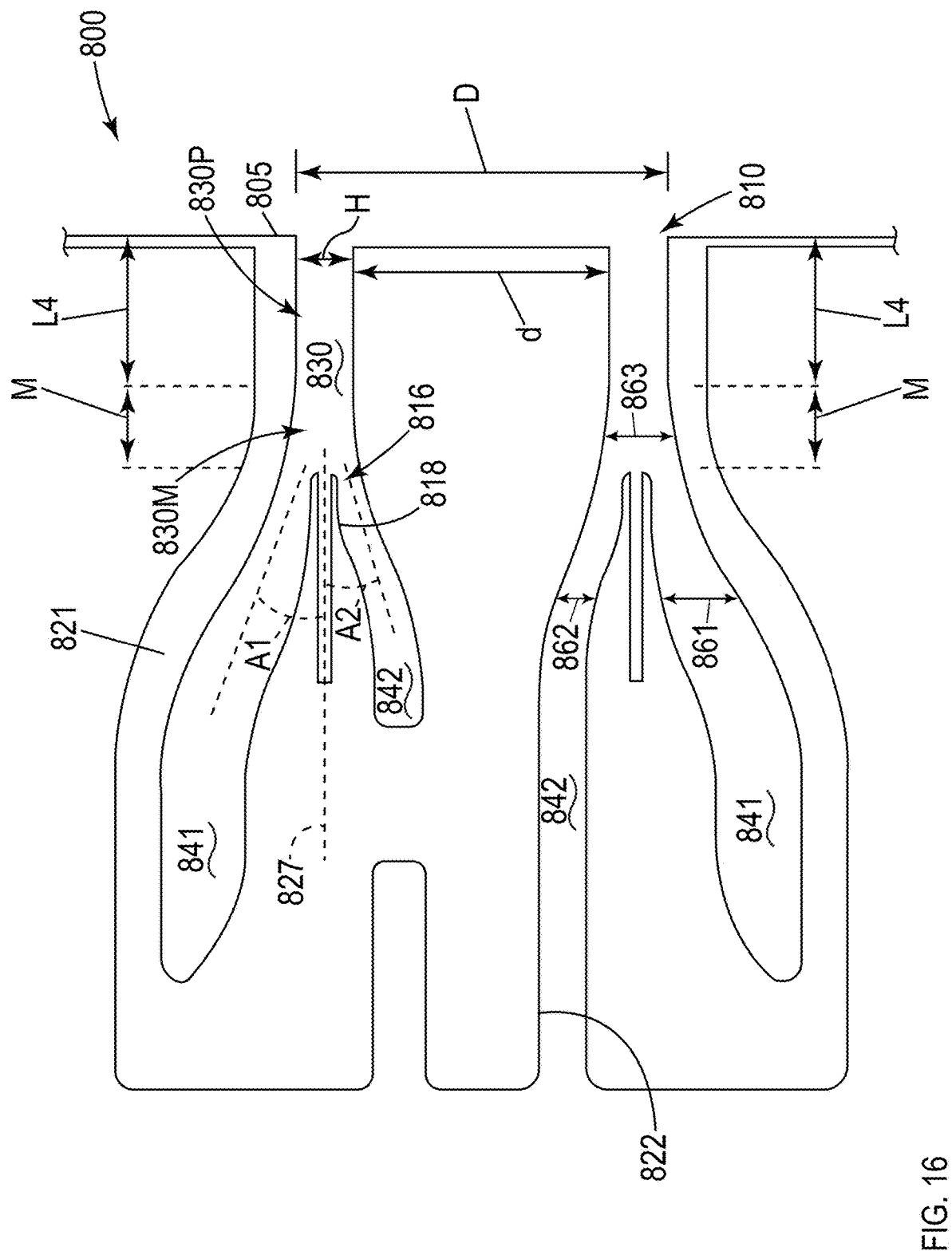
FIG. 16 is a side schematic view of the first fuel nozzle assembly of FIG. 15 illustrating a passage angle in accordance with various aspects described herein.

FIG. 15 illustrates the first fuel nozzle assembly 800 having the fuel nozzle 802 in more detail. An outer wall 821 can bound an interior and the outer wall 821 can at least partially circumferentially surround a center body 822. In some non-limiting examples, a generally cylindrical member or tube can form the outer wall 821. In some non-limiting examples, the center body 822 can include a cylindrical portion, a conical portion, or combinations thereof. In some examples the outer wall 821 and the center body 822 can be concentrically aligned. The center body 822 can also extend axially from the upstream end 803 to the downstream end 805 of the fuel nozzle assembly 800. The center body 822 can define a first longitudinal axis 824.

An annular body 829 can be provided within the interior. The annular body 829 can divide the interior into a radially outer passage 838 and a radially inner passage 839 as shown. The center body 822 can be centrally disposed within the inner passage 839 of the annular body 829 as shown. In some examples, the center body 822 can be connected to the annular body 829 by struts 828.

A fuel supply passage 806 can be provided within the interior of the annular body 829. The fuel supply passage 806 can have an annular arrangement though this need not be the case. In some aspects, a portion of the fuel supply passage 806 can be substantially concentric with the center body 822. The fuel supply passage 806 can be communicatively coupled to a fuel source or fuel supply to receive a flow of fuel therefrom.

A set of fuel outlets 816 can be formed in the annular body 829 and supplied with fuel from the fuel supply passage 806. The set of fuel outlets 816 can be disposed radially between the center body 822 and the outer wall 821. The fuel outlets 816 can be circumferentially spaced from each other in a non-limiting example.

A common flow passage 830 can be defined radially between the center body 822 and the outer wall 821 downstream of the set of fuel outlets 816. Each fuel outlet 816 can be fluidly coupled at a respective upstream end 816a to the fuel supply passage 806 to supply a respective fuel flow 850 (indicated by an arrow) therefrom.

The fuel outlets 816 can be further fluidly coupled at a respective downstream end 816b to the common flow passage 830 and configured to supply the respective fuel flow to the common flow passage 830. In some examples, the downstream end 816b of fuel outlet 816 can include a respective jet or nozzle 817. The nozzle 817 can form an annular outlet. The fuel outlets 816 can comprise a respective tubular member 818 that fluidly couples the respective upstream end 816a to the downstream end 816b.

The fuel outlets 816 are arranged to inject the respective fuel flow 850 into the common flow passage 830 at a convergence of a first air flow 851 and a second air flow 852 to thereby sandwich the respective fuel flow 850 between the first air flow 851 and second air flow 852. In some examples, the fuel flow 850, and flame body (not shown) can be maintained radially inboard from the outer wall 821 and center body 822, or otherwise substantially centrally located within the common flow passage 830. Such aspects can advantageously maintain a low shear force between the fuel and air while keeping the fuel away from the lower flow velocity regions proximal to the outer wall 821 and center body 822. Reduction of the shear reduces the shear layer deficit between the airflow and the fuel flow. The reduction of this deficit provides for improved distribution for the radial velocity profile, which provides for maintaining a high axial velocity for both the fuel and the airflow. The high axial velocity mitigates the occurrence of flame holding on the fuel nozzle 802, permitting the use of higher temperature fuels, such as hydrogen fuels.

The annular body 829 can comprise a first annular wall 831 and a second annular wall 832. The first annular wall 831 can be radially disposed between the outer wall 821 and the set of fuel outlets 816. The second annular wall 832 can be radially disposed between the center body 822 and the first annular wall 831. In some examples, the first annular wall 831 and the outer wall 821 can be concentrically aligned. The second annular wall 832 and the center body 822 can also be concentrically aligned.

A first compressed air flow passage 841 and a second compressed air flow passage 842 can also be provided in the fuel nozzle 802. In some examples, the first compressed air flow passage 841 and the second compressed air flow passage 842 can be fluidly coupled to a common source of compressed air. In some examples, the first compressed air flow passage 841 can receive a separate supply of air from the second compressed air flow passage 842.

The first compressed air flow passage 841 can be defined between the outer wall 821 and the first annular wall 831. In some examples, the first compressed air flow passage 841 can extend from the upstream end 803 of the fuel nozzle assembly 800 to the common flow passage 830. The first compressed air flow passage 841 can be in fluid communication with the common flow passage 830. The first compressed air flow passage 841 can be disposed radially outward from the set of fuel outlets 816.

The second compressed air flow passage 842 can be defined between the second annular wall 832 and the center body 822. The second compressed air flow passage 842 can be disposed radially inward from the set of fuel outlets 816. The second compressed air flow passage 842 can be in fluid communication with the common flow passage 830.

The first compressed air flow passage 841 and the second compressed air flow passage 842 can combine at an intersection 843. The common flow passage 830 can be fluidly coupled to the intersection 843. As the common flow passage 830 can also be fluidly coupled to the fuel outlet 816 it will be understood that the intersection 843 can be fluidly coupled to the fuel outlet 816.

In a non-limiting example, at least one first air inlet 833 can be provided and extend through the outer wall 821. It is also contemplated that the at least one first air inlet 833 can additionally or alternatively be defined at the upstream end 803 of the fuel nozzle assembly 800, through the base member 807, through the outer wall 821, or combinations thereof, in non-limiting examples. Further still, multiple first air inlets 833 can be circumferentially spaced from each other although this need not be the case.

In a further non-limiting example, at least one second air inlet 834 is shown extending through the base member 807. It is also contemplated that the at least one second air inlet 834 can additionally or alternatively be defined at the upstream end 803 of the fuel nozzle assembly 800, through the base member 807, through the outer wall 821, or combinations thereof, in non-limiting examples. Further still, multiple second air inlets 834 can be circumferentially spaced from each other although this need not be the case.

The at least one first air inlet 833 can be in fluid communication with the first compressed air flow passage 841 in a non-limiting example. In this manner, the first air flow 851 (indicated by dashed arrow) can be provided through the first air inlet 833 to the first compressed air flow passage 841. For example, a particular first air inlet 833 defined through an upstream end of the outer wall 821 can convey the first air flow 851 radially to the first compressed air flow passage 841. Additionally or alternatively, a particular first air inlet 833 defined through the base member 807 can convey a respective first air flow 851 axially to the first compressed air flow passage 841. The first air flow 851 can then be conveyed via the first compressed air flow passage 841 to the common flow passage 830.

The second air inlet 834 can be in fluid communication with the second compressed air flow passage 842 in a non-limiting example. In this manner, the second air flow 852 (indicated by dashed arrow) can be provided through the at least one second air inlet 834 to the second compressed air flow passage 842. The second air flow 852 can be conveyed via the second compressed air flow passage 842 to the common flow passage 830. For example, a particular second air inlet 834 defined through an upstream end of the outer wall 821 can convey a respective second air flow 852 radially to the second compressed air flow passage 842. Additionally or alternatively, a particular second air inlet 834 defined through the base member 807 can convey a respective second air flow 852 axially to the second compressed air flow passage 842. The second air flow 852 can then be conveyed via the second compressed air flow passage 842 to the common flow passage 830. It is further contemplated that the first air flow 851 and second air flow 852 can be arranged to converge proximate the fuel outlets 816.

The first compressed air flow passage 841 can define a first axial length L1, which can extend from the first air inlet 833 to the fuel outlets 816. It should be understood that the fuel outlets 816 can form an upstream end of the common flow passage 830. The second compressed air flow passage 842 can define a second axial length L2, which can extend from the second air inlet 834 to the fuel outlets 816. The first axial length LI can be the same as or different from the second axial length L2. In addition, the common flow passage 830 can define a third axial length L3, which can extend from the fuel outlets 816 to the downstream end of the mixture outlet 810.

In some examples, the respective lengths of the first axial length L1 and the second axial length L2 can be determined to reduce turbulence, wakes, or other non-uniformities present in the received respective first air flow 851 and second air flow 852 prior to mixing with the fuel flow 850. For example, the first axial length L1 of the common flow passage 830 can be determined to mitigate flashback or flame-holding from the combustor.

It is also contemplated that the common flow passage 830 can have a substantially constant cross-sectional area along at least a portion of the third axial length L3. Such a constant cross-sectional area can maintain a high velocity of the fuel flow 850 to avoid flash-back. The first axial length L1 and second axial length L2 can be predetermined or selected to streamline the air flow upstream of the fuel outlets 816. As will be appreciated, streamlining the airflow can beneficially reduce or eliminate flow asymmetry, circumferential variations, and wake. Additionally, the third axial length L3 can be predetermined to achieve a desired level of fuel-air mixing, while avoiding flame-holding or flashback.

FIG. 6 schematic illustrates the fuel nozzle assembly 800 and illustrates that the mixture outlet 810 can define an outlet diameter (designated "D"), and the downstream end of the center body 822 can define an outer diameter (designated "d").

The fuel supply passage 806 can define a second longitudinal axis 827. The second longitudinal axis 827 can be parallel to the first longitudinal axis 824, though this need not be the case. The first compressed air flow passage 841 and second compressed air flow passage 842 can be arranged to converge with respect to each other, proximate the fuel outlets 816. For example, the first compressed air flow passage 841 can define a first angle Al with respect to the second longitudinal axis 827. Similarly, the second compressed air flow passage 842 can define a second angle A2 with respect to the second longitudinal axis 827. It is contemplated that the first angle A1 and second angle A2 can each vary, independently of the other, from 0 degrees to 90 degrees, relative to the second longitudinal axis 827.

The common flow passage 830 can include an annular mixing portion 830M and an annular output portion 830P downstream of the mixing portion 830M. The mixing portion 830M can define an axial mixing length M. The output portion 830P can define an axial output length L4. The annular mixing portion 830M can be in fluid communication with the annular output portion 830P.

In some examples, the common flow passage 830 can define a common flow passage height H as well as a cross-sectional area 863. The cross-sectional area 863 can be constant or variable along the common flow passage 830. In one non-limiting example, the cross-sectional area 863 can be converging along the axial mixing length M, from upstream to downstream. In other non-limiting aspects, the cross-sectional area 863 along the axial mixing length M can be diverging from upstream to downstream. In still other non-limiting aspects, the cross-sectional area 863 along the axial mixing length M can be constant from upstream to downstream. In some examples, the cross-sectional area 863 can vary by less than 20% along the axial mixing length M or the axial output length L4.

It is contemplated that the common flow passage height H at the downstream end 805 can be determined by either or both of the nozzle outlet diameter D or the center body outer diameter d. In one non-limiting example, the common flow passage height H can be determined as 50% of the difference between the nozzle outlet diameter D and the center body outer diameter d. In various non-limiting aspects, the ratio of the nozzle outlet diameter D and the center body outer diameter d can be adapted or configured as desired, for example, depending on a desired target effective area at the mixture outlet 810. In some examples, the dimension of the axial output length L4 can be within a range of between 10% and 40% of the common flow passage height H. For example, in some non-limiting aspects, the axial output length L4 can have a dimension of between 5 mm to 20 mm. Additionally or alternatively, in some non-limiting aspects, the dimension of the axial output length L4 can be within a range of between from 0 to 25% of the axial mixing length M. For example, in some non-limiting aspects, the axial output length L4 can have a dimension of between 0 mm to 20 mm.

The first compressed air flow passage 841 can define a first cross-sectional area 861 and the second compressed air flow passage 842 can define a second cross-sectional area 862 as shown. In some examples, the second cross-sectional area 862 can be smaller than the first cross-sectional area 861. In such an instance, a flow speed through the first compressed air flow passage 841 can be slower than a flow speed through the second compressed air flow passage 842. In some examples, the first cross-sectional area 861 can be the same size as the second cross-sectional area 862. In some examples, either or both of the first cross-sectional area 861 or second cross-sectional area 862 can be varied or constant along the respective first compressed air flow passage 841 or second compressed air flow passage 842.

Figure 18:
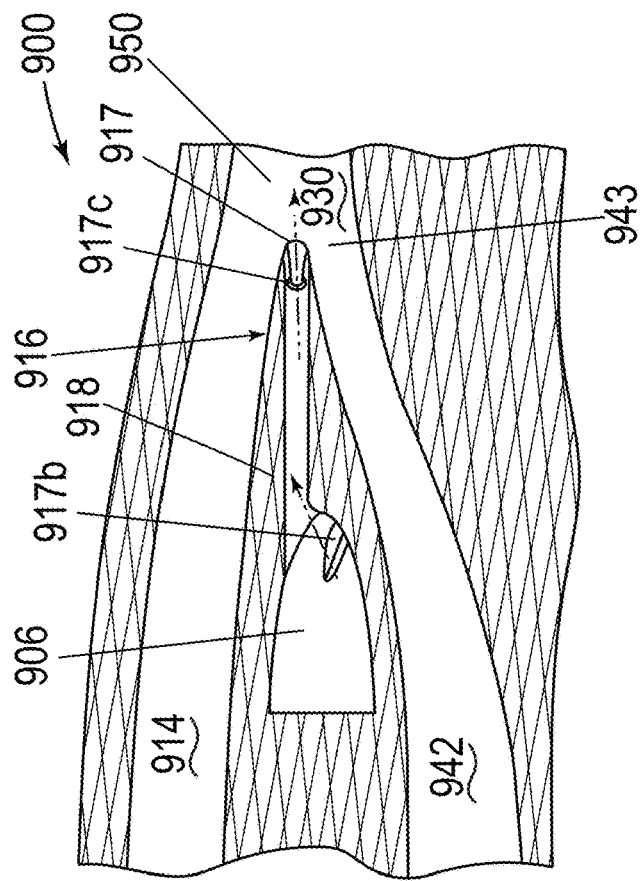
FIG. 18 is a side cross-sectional view of a second fuel nozzle assembly of FIG. 14, taken along line B-B, illustrating another fuel outlet in accordance with various aspects described herein.
Figure 17:
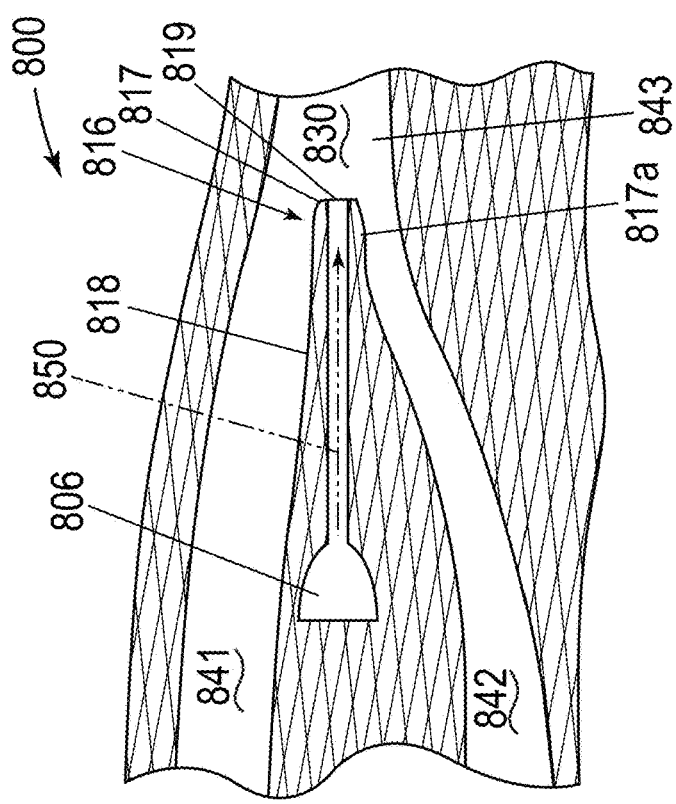
FIG. 17 is a cross-sectional view of a portion of the first fuel nozzle assembly illustrating a fuel outlet in accordance with various aspects described herein.
Figure 19:
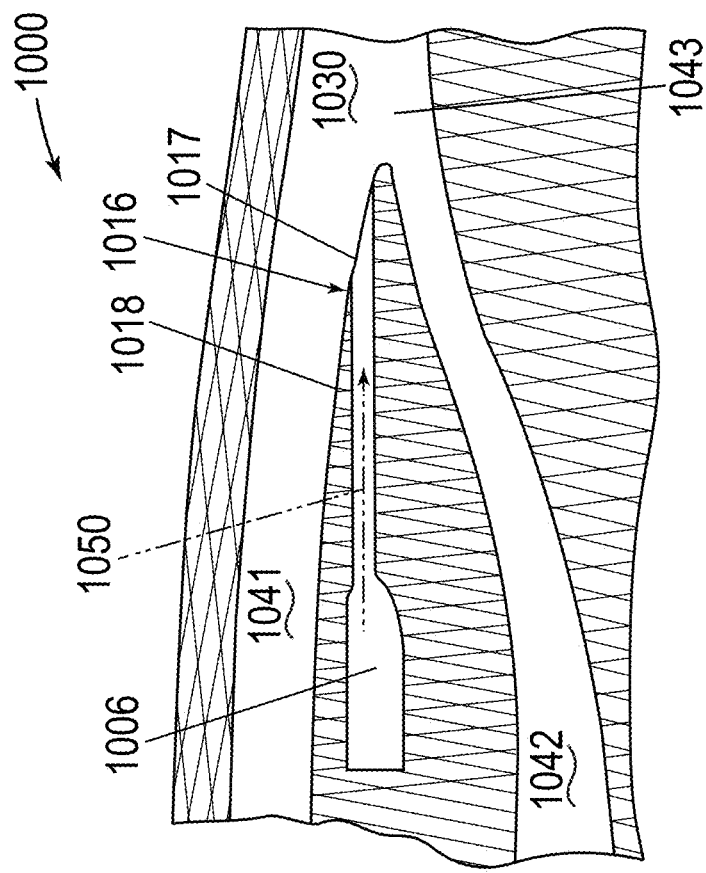
FIG. 19 is a side cross-sectional view of a third fuel nozzle assembly of FIG. 14, taken along line C-C, illustrating another fuel outlet in accordance with various aspects described herein.

FIGS. 17-19 illustrate exemplary configurations for a fuel outlet that can be utilized in the fuel mixer 790 (FIG. 14). FIG. 17 illustrates the fuel outlet 816 of the first fuel nozzle assembly 800 in a first exemplary configuration. The fuel supply passage 806, first compressed air flow passage 841, second air flow passage 842, and common flow passage 830 are shown. A boss 817a can be provided surrounding the fuel outlet 816. The boss 817a can define a circular orifice 819 therethrough. The orifice 819 can be fluidly coupled to the tubular member 818. The nozzle 817 with orifice 819 can be oriented to provide the respective fuel flow 850 directly into the common flow passage 830 at the intersection 843.

FIG. 18 illustrates the fuel nozzle assembly 900 having a fuel outlet 916 in a second exemplary configuration. A fuel supply passage 906, a nozzle 917, a first compressed air flow passage 941, a second air flow passage 942, and a common flow passage 930 are included in the fuel nozzle assembly 900. The fuel outlet 916 can include a hollow sub-passage with an inlet 917b and a sub-passage outlet 917c, where the sub-passage outlet 917c can be positioned upstream of the nozzle 917. In this manner, the nozzle 917 can be configured to diffuse or disperse a fuel flow 950 within the fuel outlet 916 upstream of the intersection 943 and common flow passage 930.

FIG. 19 illustrates the fuel nozzle assembly 1000 having a fuel outlet 816 in a third exemplary configuration. A fuel supply passage 1006, a nozzle 1017, a first compressed air flow passage 1041, a second air flow passage 1042, and a common flow passage 1030 are included in the fuel nozzle assembly 1000. In the illustrated example, the nozzle 1017 is positioned at a downstream end of the first compressed air flow passage 1041 upstream of the common flow passage 1030. It is also contemplated that the nozzle 1017 can be positioned at a downstream end of the second compressed air flow passage 1042 in another non-limiting example. In this manner, the nozzle 1017 can be oriented or configured to mix a fuel flow 1050 into one of the first compressed air flow passage 1041 or the second compressed air flow passage 1042 to form a first mixture flow, prior to mixing with air from the other of the first compressed air flow passage 1041 or the second compressed air flow passage 1042. The first mixture flow can converge with air from the other of the first compressed air flow passage 1041 or second compressed air flow passage 1042 to form a second mixture flow at the intersection 1043.

Figure 20:
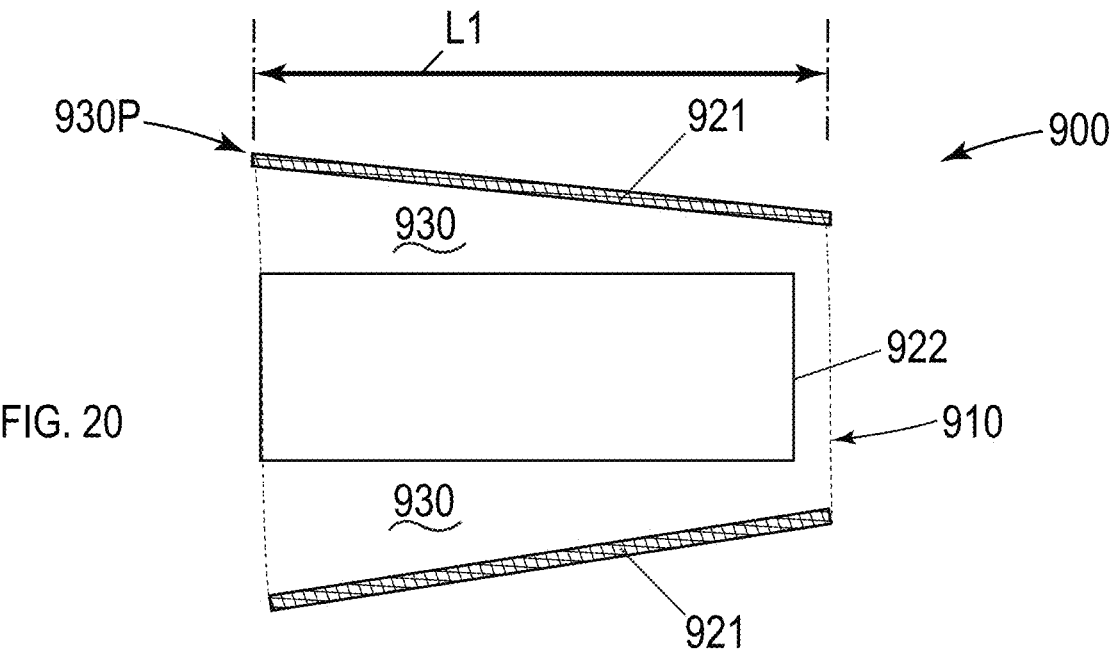
FIG. 20 is a schematic diagram of the second fuel nozzle assembly illustrating a common flow passage in a converging configuration in accordance with various aspects described herein.

FIG. 20 illustrates the second fuel nozzle assembly 900 having an outer wall 921, the center body 922, and a mixture outlet 910. In the example shown, the outer wall 921 and the center body 922 are oriented to form a decreasing cross-sectional area within the common flow passage 930 along the first axial length L1. Such a converging common flow passage 930 can be arranged by converging the outer wall 921 while keeping the center body 922 cylindrical with a constant cross-sectional area although this need not be the case. Such a decreasing cross-sectional area can form a converging common flow passage 930 in a direction toward the mixture outlet 910, which can beneficially enhance the fuel air mixing through the common flow passage 930 during operation.

Figure 21:
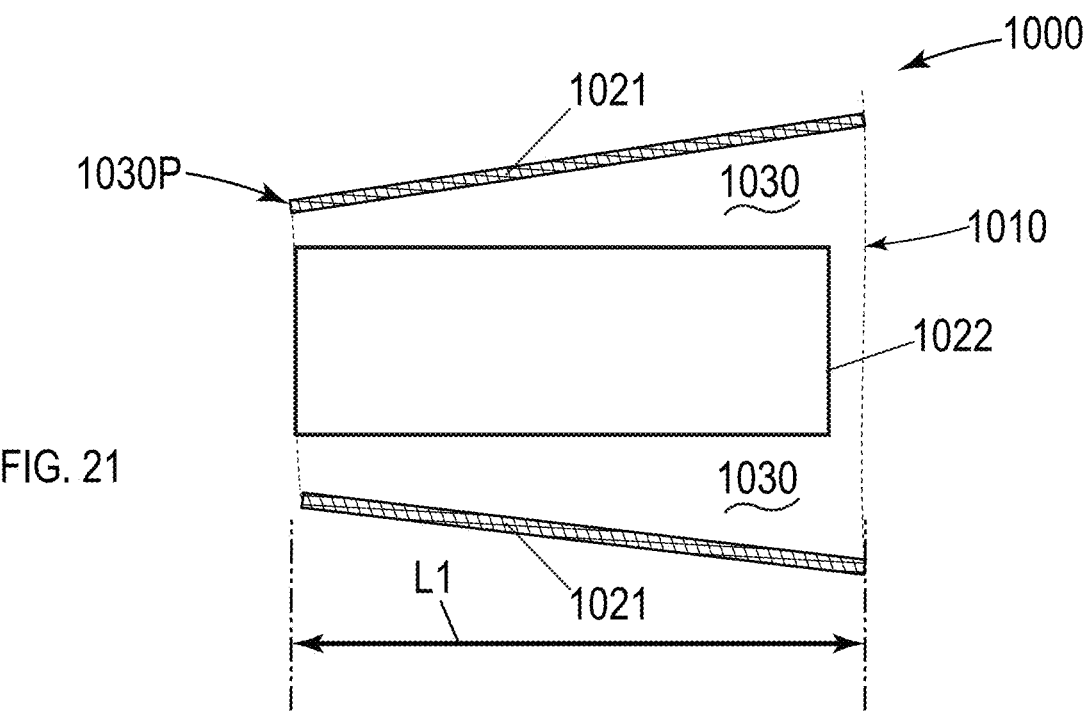
FIG. 21 is a schematic diagram of the third fuel nozzle illustrating a common flow passage in a diverging configuration in accordance with various aspects described herein.
Figure 22:
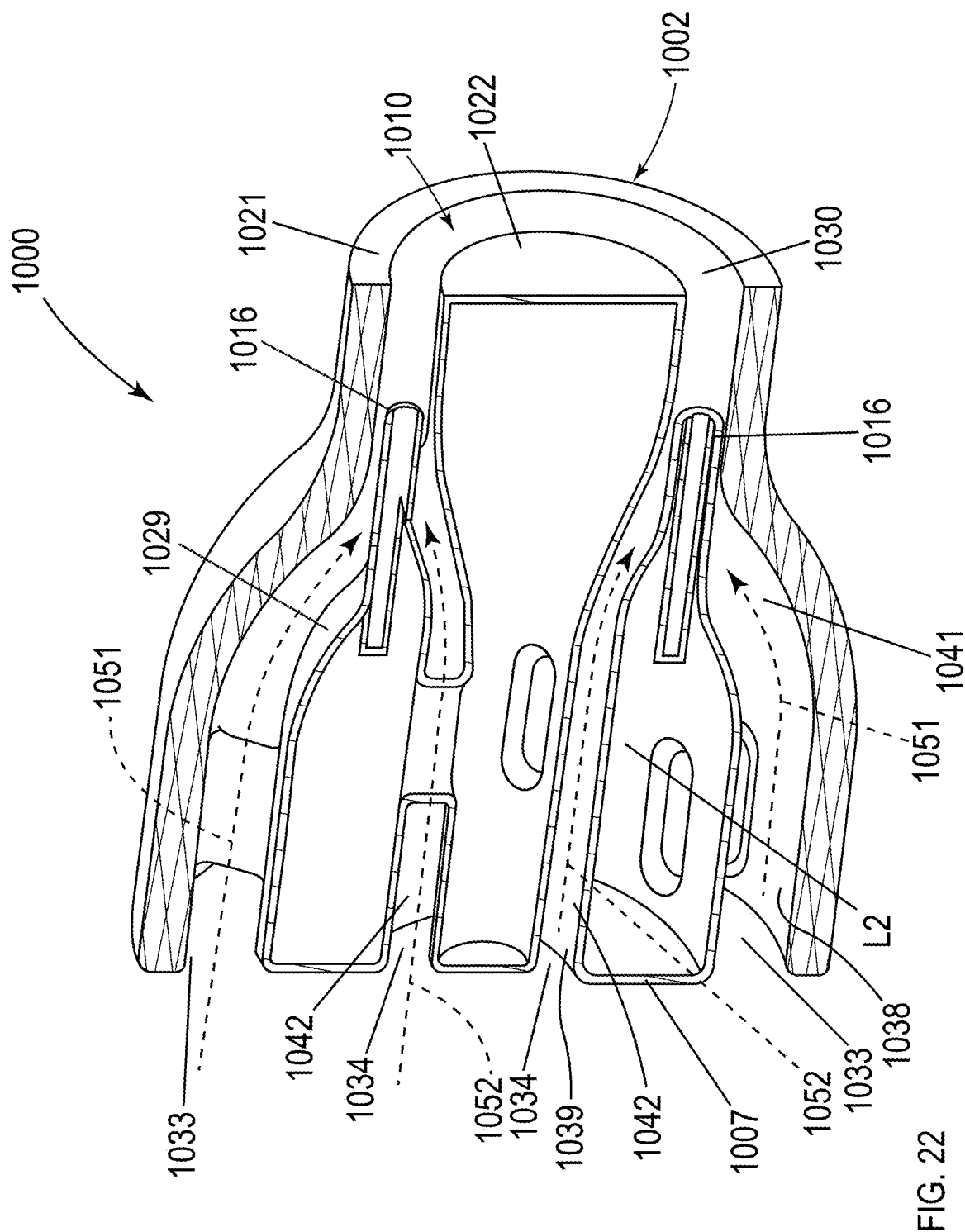
FIG. 22 is a cross-sectional view of the second fuel nozzle assembly of FIG. 14, taken along line B-B, in accordance with various aspects described herein.
Figure 23:
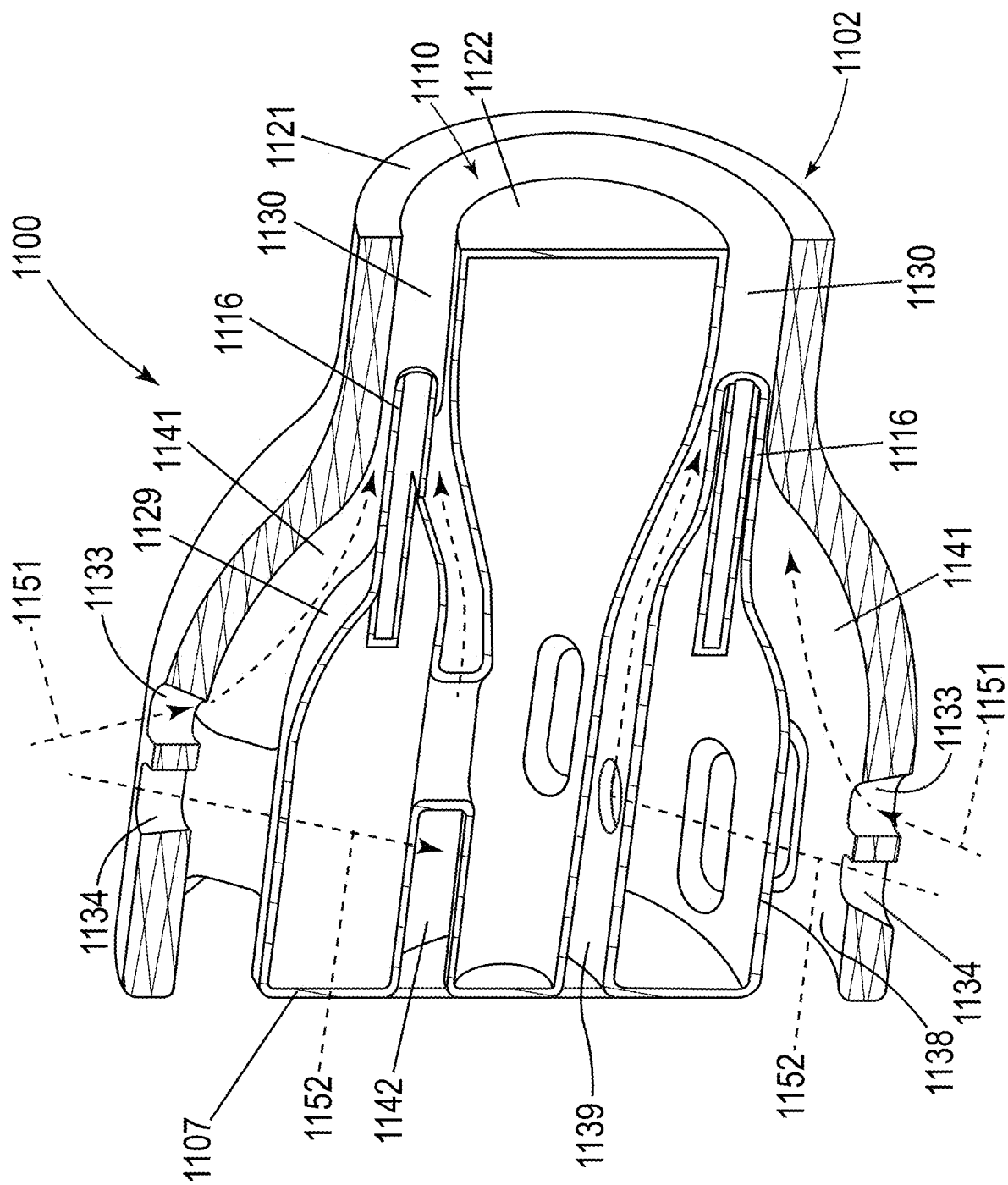
FIG. 23 is a cross-sectional view of a fourth fuel nozzle assembly of FIG. 14, taken along line D-D, in accordance with various aspects described herein.

FIG. 21 illustrates the third fuel nozzle assembly 1000 having an outer wall 1021, the center body 1022, and a mixture outlet 1010. In the example shown, the outer wall 1021 and center body 1022 are oriented to form an increasing cross-sectional area within the common flow passage 1030 along the first axial length L1. Such an increasing common flow passage 1030 can be arranged by diverging the outer wall 1021 while keeping the center body 1022 cylindrical with a constant cross-sectional area although this need not be the case. Such an increasing cross-sectional area can form a diverging common flow passage 1030 in a direction toward the mixture outlet 1010, which enables upstream radial spreading of the fuel and air and directs the fuel-air mixture radially outward along the common flow passage 1030 to improve mixing of the fuel and air.

FIG. 12 shows a cross-sectional view of the third fuel nozzle assembly 1000. A fuel nozzle 1002 with a base member 1007, the outer wall 1021, the fuel outlet 1016, the center body 1022, an annular body 1029, the common flow passage 1030, the first and second compressed air flow passages 1041, 1042, a radially outer passage 1038, a radially inner passage 1039, at least one first air inlet 1033, at least one second air inlet 1034, and the mixture outlet 1010 can be included in the third fuel nozzle assembly 1000 as shown. A first air flow 1051 and a second air flow 1052 are illustrated through the fuel nozzle assembly 1000.

One difference compared to the fuel nozzle assembly 800 is that each of the first air inlet 1033 and the second air inlet 1034 can be provided in the base member 1007 as shown. In this manner, the first air inlet 1033 and the second air inlet 1034 can convey the respective first air flow 1051 and second air flow 1052 axially to the respective first compressed air flow passages 1041 and the second compressed air flow passage 1042. The first air flow 1051 and the second air flow 1052 can also be conveyed to the common flow passage 1030 toward the mixture outlet 1010 as shown.

FIG. 13 shows a cross-sectional view of the fourth fuel nozzle assembly 1100. A fuel nozzle 1102 with a base member 1107, an outer wall 1121, a fuel outlet 1116, a center body 1122, an annular body 1129, a common flow passage 1130, first and second compressed air flow passages 1141, 1142, a radially outer passage 1138, a radially inner passage 1139, at least one first air inlet 1133, at least one second air inlet 1134, and a mixture outlet 1110 can be included in the fourth fuel nozzle assembly 1100 as shown. A first air flow 1151 and second air flow 1152 are illustrated through the fuel nozzle assembly 1100.

One difference compared to the fuel nozzle assembly 800 is that each of the first air inlet 1133 and the second air inlet 1134 can be provided in the outer wall 1121 as shown. In this manner, the first air inlet 1133 and the second air inlet 1134 can convey the respective first air flow 1151 and the second air flow 1152 radially with respect to the respective first compressed air flow passage 1141 and the second compressed air flow passage 1142. The first air flow 1151 and the second air flows 1152 can also be conveyed to the common flow passage 1130 toward the mixture outlet 1110 as shown.

It should be appreciated that the aspects and embodiments provided herein are not limited to those embodiments as shown. More specifically, one or more aspects of one embodiment can be combined with, interchanged with, or removed from one or more of the other embodiments, such that additional embodiments are contemplated within the scope of this disclosure by a person having ordinary skill in the art, while not explicitly shown.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the present disclosure are provided by the subject matter of the following clauses.

A gas turbine engine includes a hydrogen fuel delivery assembly configured to deliver a hydrogen fuel flow, a compressor section configured to compress air flowing therethrough to provide a compressed air flow, and a combustor including a combustion chamber having a burner length L and a burner dome height H, the combustion chamber configured to combust a mixture of the hydrogen fuel flow and the compressed air flow, and the combustion chamber being characterized by a combustor size rating between one inch and seven inches.

The gas turbine engine of the preceding clause, wherein the combustor further includes an outer liner and an inner liner, the combustion chamber having a forward end and being defined between the outer liner and the inner liner, each of the outer liner and the inner liner having an inner surface, and wherein H is the maximum height between the inner surface of the outer liner and the inner surface of the inner liner at the forward end of the combustion chamber.

The gas turbine engine of any preceding clause, wherein the combustor size rating is between two inches and seven inches.

The gas turbine engine of any preceding clause, wherein the combustor size rating is between two inches and six inches.

The gas turbine engine of any preceding clause, wherein the combustor size rating is between three inches and six inches.

The gas turbine engine of any preceding clause, wherein the burner length is between two inches and six inches.

The gas turbine engine of any preceding clause, wherein the burner length is between two inches and three inches.

The gas turbine engine of any preceding clause, wherein the burner length is between two and one half inches and three and one half inches.

The gas turbine engine of any preceding clause, wherein the burner dome height is between two and one half inches and six inches.

The gas turbine engine of any preceding clause, wherein the burner dome height is between two and one half inches and five inches.

The gas turbine engine of any preceding clause, wherein the burner dome height is between four inches and five inches.

The gas turbine engine of any preceding clause, wherein the burner length, squared, is between six square inches and thirty-five square inches.

The gas turbine engine of any preceding clause, wherein the burner length, squared, is between six square inches and twenty square inches.

The gas turbine engine of any preceding clause, wherein the burner length, squared, is between six square inches and twelve square inches.

The gas turbine engine of any preceding clause, wherein the burner length, squared, is between eight square inches and twelve square inches.

The gas turbine engine of any preceding clause, wherein no diluent is added to the combustion chamber.

The gas turbine engine of any preceding clause, wherein the combustor size rating is defined by a relationship of the burner length, squared, and the burner dome height.

The gas turbine engine of any preceding clause, further comprising a turbine nozzle downstream of the combustion chamber, wherein L is the distance between a plane orthogonal to a forward line at which the burner dome height is measured and a leading edge of the turbine nozzle.

The gas turbine engine of any preceding clause, further comprising one or more rotating blades.

The gas turbine engine of any preceding clause, further comprising one or more stationary vanes, wherein the one or more stationary vanes are positioned forward of the rotating blades.

The gas turbine engine of any preceding clause, further comprising one or more stationary vanes, wherein the one or more stationary vanes are positioned aft of the rotating blades.

The gas turbine engine of any preceding clause, further comprising a first set of one or more rotating blades and a second set of rotating blades, the first set of rotating blades and the second set of rotating blades being configured to operate in a counter-rotating fashion.

The gas turbine engine of any preceding clause, further comprising a plurality of fan blades located forward of the combustor in a puller configuration.

The gas turbine engine of any preceding clause, further comprising a plurality of fan blades, the combustor located forward of the plurality of fan blades in a pusher configuration.

The gas turbine engine of any preceding clause, wherein the gas turbine engine is one of a turbofan engine, an unducted single fan engine, a turbojet engine, a turboshaft engine, or a turboprop engine.

The gas turbine engine of any preceding clause, wherein the gas turbine engine is a turbofan engine comprising an outer nacelle that houses the compressor section, the combustor, and a plurality of fan blades.

The gas turbine engine of any preceding clause, wherein the gas turbine engine is an unducted single fan engine comprising a spinner coupled to a nacelle, the nacelle housing the compressor section and the combustor, a plurality of outlet guide vanes coupled to an outer surface of the nacelle, and a plurality of fan blades coupled to the spinner and rotatable therewith.

The gas turbine engine of any preceding clause, wherein the gas turbine engine is a turbojet engine comprising an outer nacelle that houses the compressor section and the combustor, the turbojet engine not including a fan with bypass duct.

The gas turbine engine of any preceding clause, further including a hydrogen fuel tank for holding the hydrogen fuel in a liquid phase, the hydrogen fuel delivery assembly being connected to the hydrogen fuel tank, and a vaporizer in communication with the hydrogen fuel delivery assembly for heating the hydrogen fuel in the liquid phase to at least one of a gaseous phase and a supercritical phase, the vaporizer being located between the hydrogen fuel tank and the combustor.

An aircraft including a fuselage, a wing connected to the fuselage, and the gas turbine engine of any preceding clause.

The aircraft of the preceding clause, wherein the hydrogen fuel tank is positioned at least partially within at least one of the fuselage and the wing, and wherein the vaporizer is positioned at least partially within at least one of the fuselage, the wing, and the gas turbine engine.

A gas turbine engine including a hydrogen fuel delivery assembly configured to deliver a hydrogen fuel flow, a compressor section configured to compress air flowing therethrough to provide a compressed air flow, and a combustor including a combustion chamber characterized by a combustor size rating between one inch and seven inches at a core air flow parameter between two and one half kN and sixty kN, wherein the combustor size rating is a function of the core air flow parameter.

The gas turbine engine of any preceding clause, wherein the core air flow parameter is a relationship between the thrust and bypass ratio.

The gas turbine engine of any preceding clause, wherein the combustor size rating is between two inches and three and one quarter inches at a core air flow parameter between two and one half kN and fifty kN.

The gas turbine engine of any preceding clause, wherein the combustor size rating is based on a thrust of the gas turbine engine.

The gas turbine engine of any preceding clause, wherein the thrust is between sixty kN and five hundred kN.

The gas turbine engine of any preceding clause, wherein the combustor size rating is defined by a relationship of the burner length, squared, and the burner dome height.

The gas turbine engine of any preceding clause, further comprising a turbine nozzle downstream of the combustion chamber, wherein the burner length is the distance between a plane orthogonal to a forward line at which the burner dome height is measured and a leading edge of the turbine nozzle.

The gas turbine engine of any preceding clause, wherein the burner length, squared, is between six square inches and thirty-five square inches.

The gas turbine engine of any preceding clause, wherein the combustor further includes an outer liner and an inner liner, the combustion chamber having a forward end and being defined between the outer liner and the inner liner, each of the outer liner and the inner liner having an inner surface, and wherein the burner dome height is the maximum height between the inner surface of the outer liner and the inner surface of the inner liner at the forward end of the combustion chamber.

The gas turbine engine of any preceding clause, wherein the combustor size rating is between two inches and seven inches.

The gas turbine engine of any preceding clause, wherein the combustor size rating is between two inches and six inches.

The gas turbine engine of any preceding clause, wherein the combustor size rating is between three inches and six inches.

The gas turbine engine of any preceding clause, wherein the burner length is between two inches and six inches.

The gas turbine engine of any preceding clause, wherein the burner length is between two inches and three inches.

The gas turbine engine of any preceding clause, wherein the burner length is between two and one half inches and three and one half inches.

The gas turbine engine of any preceding clause, wherein the burner dome height is between two and one half inches and six inches.

The gas turbine engine of any preceding clause, wherein the burner dome height is between two and one half inches and five inches.

The gas turbine engine of any preceding clause, wherein the burner dome height is between four inches and five inches.

The gas turbine engine of any preceding clause, wherein the burner length, squared, is between six square inches and twenty square inches.

The gas turbine engine of any preceding clause, wherein the burner length, squared, is between six square inches and twelve square inches.

The gas turbine engine of any preceding clause, wherein the burner length, squared, is between eight square inches and twelve square inches.

The gas turbine engine of any preceding clause, wherein no diluent is added to the combustion chamber.

The gas turbine engine of any preceding clause, further comprising one or more rotating blades.

The gas turbine engine of any preceding clause, further comprising one or more stationary vanes, wherein the one or more stationary vanes are positioned forward of the rotating blades.

The gas turbine engine of any preceding clause, further comprising one or more stationary vanes, wherein the one or more stationary vanes are positioned aft of the rotating blades.

The gas turbine engine of any preceding clause, further comprising a first set of one or more rotating blades and a second set of rotating blades, the first set of rotating blades and the second set of rotating blades being configured to operate in a counter-rotating fashion.

The gas turbine engine of any preceding clause, further comprising a plurality of fan blades located forward of the combustor in a puller configuration.

The gas turbine engine of any preceding clause, further comprising a plurality of fan blades, the combustor located forward of the plurality of fan blades in a pusher configuration.

The gas turbine engine of any preceding clause, wherein the gas turbine engine is one of a turbofan engine, an unducted single fan engine, a turbojet engine, a turboshaft engine, or a turboprop engine.

The gas turbine engine of any preceding clause, wherein the gas turbine engine is a turbofan engine comprising an outer nacelle that houses the compressor section, the combustor, and a plurality of fan blades.

The gas turbine engine of any preceding clause, wherein the gas turbine engine is an unducted single fan engine comprising a spinner coupled to a nacelle, the nacelle housing the compressor section and the combustor, a plurality of outlet guide vanes coupled to an outer surface of the nacelle, and a plurality of fan blades coupled to the spinner and rotatable therewith.

The gas turbine engine of any preceding clause, wherein the gas turbine engine is a turbojet engine comprising an outer nacelle that houses the compressor section and the combustor, the turbojet engine not including a fan with bypass duct.

The gas turbine engine of any preceding clause, further including a hydrogen fuel tank for holding the hydrogen fuel in a liquid phase, the hydrogen fuel delivery assembly being connected to the hydrogen fuel tank, and a vaporizer in communication with the hydrogen fuel delivery assembly for heating the hydrogen fuel in the liquid phase to at least one of a gaseous phase and a supercritical phase, the vaporizer being located between the hydrogen fuel tank and the combustor.

An aircraft including a fuselage, a wing connected to the fuselage, and the gas turbine engine of any preceding clause.

The aircraft of the preceding clause, wherein the hydrogen fuel tank is positioned at least partially within at least one of the fuselage and the wing, and wherein the vaporizer is positioned at least partially within at least one of the fuselage, the wing, and the gas turbine engine.

A gas turbine engine includes a hydrogen fuel delivery assembly configured to deliver a hydrogen fuel flow, a compressor section configured to compress air flowing therethrough to provide a compressed air flow, and combustion section having a combustor with a fuel mixer and a combustion characterized by a combustor size rating between one inch and seven inches at a core air flow parameter between two and one half kN and sixty kN, wherein the combustor size rating is a function of the core air flow parameter, and wherein the combustor size rating is defined by a relationship of the burner length, squared, and the burner dome height and wherein the core air flow parameter is a relationship between the thrust and bypass ratio, and the fuel mixer comprising: an outer wall defining a longitudinal direction and having a mixture outlet, a first compressed air flow passage and a second compressed air flow passage forming an intersection, a common flow passage fluidly coupled to the intersection and to the mixture outlet, and a fuel supply passage having a fuel outlet fluidly coupled to at least one of the first compressed air flow passage, the second compressed air flow passage, or the intersection.

The turbine engine of any preceding clause, further comprising a center body located within the outer wall and at least partially forming an annular profile for each of the first compressed air flow passage, the second compressed air flow passage, and the intersection between the center body and the outer wall.

The turbine engine of any preceding clause, wherein at least one of the fuel outlet or the mixture outlet is annular.

The turbine engine of any preceding clause, wherein the common flow passage defines a mixing portion and an outlet portion, with the mixing portion adjacent the fuel outlet and the outlet portion adjacent the mixture outlet.

The turbine engine of any preceding clause, wherein the common flow passage defines a cross-sectional area that varies less than 20% within the mixing portion.

The turbine engine of any preceding clause, wherein the outer wall forms an acute angle with the center body.

The turbine engine of any preceding clause, wherein the outer wall and the center body form one of a converging cross-sectional area or a diverging cross-sectional area along a downstream direction through the outlet portion.

The turbine engine of any preceding clause, wherein the first compressed air flow passage comprises a first cross-sectional area, and the second compressed air flow passage comprises a second cross-sectional area different from the first cross-sectional area upstream of the intersection.

The turbine engine of any preceding clause, wherein the fuel outlet is fluidly coupled to the intersection.

The turbine engine of any preceding clause, wherein the fuel outlet is fluidly coupled to the first compressed air flow passage upstream of the intersection.

The turbine engine of any preceding clause, wherein the fuel outlet comprises a hollow sub-passage having a sub-passage outlet upstream of the intersection.

The turbine engine of any preceding clause, wherein the first compressed air flow passage defines a first angle with respect to the fuel supply passage and the second compressed air flow passage defines a second angle with respect to the fuel supply passage, with the first angle being different from the second angle.

The turbine engine of any preceding clause, wherein the first angle is larger than the second angle.

The turbine engine of any preceding clause, wherein the first compressed air flow passage comprises a first inlet and the second compressed air flow passage comprises a second inlet, with at least one of the first inlet or the second inlet oriented to provide compressed air along a direction that is one of parallel or perpendicular to the longitudinal direction.

The turbine engine of any preceding clause, wherein at least one of the first inlet or the second inlet are located in the outer wall.

The gas turbine engine of any preceding clause, wherein the combustor size rating is between two inches and three and one quarter inches at a core air flow parameter between two and one half kN and fifty kN.

The gas turbine engine of any preceding clause, wherein the combustor size rating is based on a thrust of the gas turbine engine.

The gas turbine engine of any preceding clause, wherein the thrust is between sixty kN and five hundred kN.

The gas turbine engine of any preceding clause, further comprising a turbine nozzle downstream of the combustion chamber, wherein the burner length is the distance between a plane orthogonal to a forward line at which the burner dome height is measured and a leading edge of the turbine nozzle.

The gas turbine engine of any preceding clause, wherein the burner length, squared, is between six square inches and thirty-five square inches.

The gas turbine engine of any preceding clause, wherein the combustor further includes an outer liner and an inner liner, the combustion chamber having a forward end and being defined between the outer liner and the inner liner, each of the outer liner and the inner liner having an inner surface, and wherein the burner dome height is the maximum height between the inner surface of the outer liner and the inner surface of the inner liner at the forward end of the combustion chamber.

The gas turbine engine of any preceding clause, wherein the combustor size rating is between two inches and seven inches.

The gas turbine engine of any preceding clause, wherein the combustor size rating is between two inches and six inches.

The gas turbine engine of any preceding clause, wherein the combustor size rating is between three inches and six inches.

The gas turbine engine of any preceding clause, wherein the burner length is between two inches and six inches.

The gas turbine engine of any preceding clause, wherein the burner length is between two inches and three inches.

The gas turbine engine of any preceding clause, wherein the burner length is between two and one half inches and three and one half inches.

The gas turbine engine of any preceding clause, wherein the burner dome height is between two and one half inches and six inches.

The gas turbine engine of any preceding clause, wherein the burner dome height is between two and one half inches and five inches.

The gas turbine engine of any preceding clause, wherein the burner dome height is between four inches and five inches.

The gas turbine engine of any preceding clause, wherein the burner length, squared, is between six square inches and twenty square inches.

The gas turbine engine of any preceding clause, wherein the burner length, squared, is between six square inches and twelve square inches.

The gas turbine engine of any preceding clause, wherein the burner length, squared, is between eight square inches and twelve square inches.

The gas turbine engine of any preceding clause, wherein no diluent is added to the combustion chamber.

The gas turbine engine of any preceding clause, further comprising one or more rotating blades.

The gas turbine engine of any preceding clause, further comprising one or more stationary vanes, wherein the one or more stationary vanes are positioned forward of the rotating blades.

The gas turbine engine of any preceding clause, further comprising one or more stationary vanes, wherein the one or more stationary vanes are positioned aft of the rotating blades.

The gas turbine engine of any preceding clause, further comprising a first set of one or more rotating blades and a second set of rotating blades, the first set of rotating blades and the second set of rotating blades being configured to operate in a counter-rotating fashion.

The gas turbine engine of any preceding clause, further comprising a plurality of fan blades located forward of the combustor in a puller configuration.

The gas turbine engine of any preceding clause, further comprising a plurality of fan blades, the combustor located forward of the plurality of fan blades in a pusher configuration.

The gas turbine engine of any preceding clause, wherein the gas turbine engine is one of a turbofan engine, an unducted single fan engine, a turbojet engine, a turboshaft engine, or a turboprop engine.

The gas turbine engine of any preceding clause, wherein the gas turbine engine is a turbofan engine comprising an outer nacelle that houses the compressor section, the combustor, and a plurality of fan blades.

The gas turbine engine of any preceding clause, wherein the gas turbine engine is an unducted single fan engine comprising a spinner coupled to a nacelle, the nacelle housing the compressor section and the combustor, a plurality of outlet guide vanes coupled to an outer surface of the nacelle, and a plurality of fan blades coupled to the spinner and rotatable therewith.

The gas turbine engine of any preceding clause, wherein the gas turbine engine is a turbojet engine comprising an outer nacelle that houses the compressor section and the combustor, the turbojet engine not including a fan with bypass duct.

The gas turbine engine of any preceding clause, further including a hydrogen fuel tank for holding the hydrogen fuel in a liquid phase, the hydrogen fuel delivery assembly being connected to the hydrogen fuel tank, and a vaporizer in communication with the hydrogen fuel delivery assembly for heating the hydrogen fuel in the liquid phase to at least one of a gaseous phase and a supercritical phase, the vaporizer being located between the hydrogen fuel tank and the combustor.

An aircraft including a fuselage, a wing connected to the fuselage, and the gas turbine engine of any preceding clause.

The aircraft of the preceding clause, wherein the hydrogen fuel tank is positioned at least partially within at least one of the fuselage and the wing, and wherein the vaporizer is positioned at least partially within at least one of the fuselage, the wing, and the gas turbine engine.

A method of mixing fuel in the combustor of the turbine engine of any proceeding clause, the method comprising flowing a first compressed air flow, flowing a second compressed air flow, converging the first and second compressed air flows at an intersection to form a converged air flow, introducing fuel to at least one of the first compressed air flow, the second compressed air flow, or the converged air flow to form a mixture flow, and flowing at least the mixture flow to a mixture outlet of a fuel mixer of the combustor.

The method of any preceding clause wherein introducing fuel comprises introducing fuel to the converged air flow to form the mixture flow.

The method of any preceding clause wherein introducing fuel further comprises introducing fuel between the first compressed air flow and the second compressed air flow to form the mixture flow as a layered flow.

The method of any preceding clause, further comprising introducing fuel to the first compressed air flow upstream of the intersection to form the mixture flow and converging the mixture flow with the second compressed air flow at the intersection to form a second mixture flow.

Although the foregoing description is directed to the preferred embodiments, it is noted that other variations and modifications will be apparent to those skilled in the art and may be made without departing from the spirit or scope of the disclosure Moreover, features described in connection with one embodiment may be used in conjunction with other embodiments, even if not explicitly stated above.

What is claimed is:

1. A gas turbine engine comprising:
a hydrogen fuel delivery assembly configured to deliver a hydrogen fuel flow;
a compressor section configured to compress air flowing therethrough to provide a compressed air flow; and
a combustion section having a combustor with a fuel mixer and the combustor configured to operate without diluent, the combustor having an inner liner, an outer liner, and a combustion chamber, the combustion chamber characterized by a combustor size rating between one inch and seven inches at a core air flow parameter between two and one half kN and sixty kN, wherein the combustor size rating is a function of the core air flow parameter, and wherein the combustor size rating is defined by:

$$\frac{L^2}{H}$$

wherein H is a maximum height of the combustion chamber measured by a forward line extending from an inner surface of the outer liner to an inner surface of the inner liner and L is a length of the combustion chamber measured from a midpoint of the forward line to a midpoint of an aft line, the aft line extending from the inner surface of the inner liner to the inner surface of the outer liner at a leading edge of a turbine nozzle, and, wherein the core air flow parameter is defined by:

$$\frac{Thrust}{Bypass\ Ratio}$$

and, the fuel mixer comprising:
an outer wall defining a longitudinal direction and having a mixture outlet;
a first compressed air flow passage and a second compressed air flow passage forming an intersection;
a common flow passage fluidly coupled to the intersection and to the mixture outlet; and
a fuel supply passage having a fuel outlet fluidly coupled to at least one of the first compressed air flow passage, the second compressed air flow passage, or the intersection.

2. The gas turbine engine of claim 1, further comprising a center body located within the outer wall and at least partially forming an annular profile for each of the first compressed air flow passage, the second compressed air flow passage, and the intersection between the center body and the outer wall.

3. The gas turbine engine of claim 2, wherein at least one of the fuel outlet or the mixture outlet is annular.

4. The gas turbine engine of claim 1, wherein the common flow passage defines a mixing portion and an outlet portion, with the mixing portion adjacent the fuel outlet and the outlet portion adjacent the mixture outlet.

5. The gas turbine engine of claim 4, wherein the common flow passage defines a cross-sectional area that varies less than 20% within the mixing portion.

6. The gas turbine engine of claim 1, wherein the first compressed air flow passage comprises a first cross-sectional area and the second compressed air flow passage comprises a second cross-sectional area different from the first cross-sectional area upstream of the intersection.

7. The gas turbine engine of claim 1, wherein the fuel outlet is fluidly coupled to the intersection.

8. The gas turbine engine of claim 1, wherein the fuel outlet is fluidly coupled to the first compressed air flow passage upstream of the intersection.

9. The gas turbine engine of claim 1, wherein the fuel outlet comprises a hollow sub-passage having a sub-passage outlet upstream of the intersection.

10. The gas turbine engine of claim 1, wherein the first compressed air flow passage defines a first angle with respect to the fuel supply passage and the second compressed air flow passage defines a second angle with respect to the fuel supply passage, with the first angle being different from the second angle.

11. The gas turbine engine of claim 1, wherein the first compressed air flow passage comprises a first inlet and the second compressed air flow passage comprises a second inlet, with at least one of the first inlet or the second inlet oriented to provide compressed air along a direction that is one of parallel or perpendicular to the longitudinal direction.

12. The gas turbine engine of claim 11, wherein at least one of the first inlet or the second inlet are located in the outer wall.

13. The gas turbine engine of claim 1, wherein the combustor size rating is between two inches and three and one quarter inches at a core air flow parameter between two and one half kN and fifty kN.

14. The gas turbine engine of claim 1, wherein the combustor size rating is based on a thrust of the gas turbine engine.

15. The gas turbine engine of claim 14, wherein the thrust is between sixty kN and five hundred kN.

16. The gas turbine engine of claim 1, further comprising a fuel tank coupled to the hydrogen fuel delivery assembly, wherein hydrogen fuel in the fuel tank is substantially completely in the liquid phase.

17. The gas turbine engine of claim 16, wherein the hydrogen fuel delivery assembly comprises a vaporizer in thermal communication with a heat source, such that the vaporizer heats the liquid hydrogen fuel received from the fuel tank.

18. A method of mixing fuel in the combustor of the gas turbine engine of claim 1, the method comprising:
flowing a first compressed air flow;
flowing a second compressed air flow;
converging the first and second compressed air flows at the intersection to form a converged air flow;
introducing fuel to at least one of the first compressed air flow, the second compressed air flow, or the converged air flow to form a mixture flow; and
flowing at least the mixture flow to the mixture outlet of the fuel mixer of the combustor.

19. The method of claim 18, wherein introducing fuel further comprises introducing fuel between the first compressed air flow and the second compressed air flow to form the mixture flow as a layered flow.

20. The method of claim 18, wherein introducing fuel further comprises introducing fuel to the first compressed air flow upstream of the intersection to form the mixture flow and converging the mixture flow with the second compressed air flow at the intersection to form a second mixture flow.

* * * * *